US012203759B2

United States Patent
Miyahara et al.

(10) Patent No.: US 12,203,759 B2
(45) Date of Patent: Jan. 21, 2025

(54) RENDEZVOUS ASSISTANCE SYSTEM AND RENDEZVOUS ASSISTANCE METHOD

(71) Applicant: Mitsubishi Electric Corporation, Tokyo (JP)

(72) Inventors: Tadashi Miyahara, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 289 days.

(21) Appl. No.: 17/779,905

(22) PCT Filed: Feb. 27, 2020

(86) PCT No.: PCT/JP2020/008012
§ 371 (c)(1),
(2) Date: May 25, 2022

(87) PCT Pub. No.: WO2021/171475
PCT Pub. Date: Sep. 2, 2021

(65) Prior Publication Data
US 2023/0003535 A1 Jan. 5, 2023

(51) Int. Cl.
*G01C 21/34* (2006.01)
*G06F 3/01* (2006.01)
(Continued)

(52) U.S. Cl.
CPC ......... *G01C 21/3438* (2013.01); *G06F 3/017* (2013.01); *H04L 51/07* (2022.05); *H04L 51/222* (2022.05); *G06Q 50/40* (2024.01)

(58) Field of Classification Search
CPC ..... G01C 21/3438; G06F 3/017; H04L 51/07; H04L 51/222; G06Q 50/40; G08G 1/09
See application file for complete search history.

(56) References Cited

U.S. PATENT DOCUMENTS 8,744,645 B1 * 6/2014 Vaghefinazari .... G01C 21/3664
  701/1
10,511,971 B1 * 12/2019 Akpinar ................ G06Q 10/02
(Continued)

FOREIGN PATENT DOCUMENTS

| JP | 2002-342427 A | 11/2002 |
| JP | 2014-41604 A | 3/2014 |
| JP | 2019-53547 A | 4/2019 |

OTHER PUBLICATIONS

Chinese Office Action and Search Report dated Jun. 29, 2023 for Application No. 202080097041.0 with an English translation.
(Continued)

*Primary Examiner* — Kenny Nguyen
(74) *Attorney, Agent, or Firm* — Birch, Stewart, Kolasch & Birch, LLP

(57) ABSTRACT

The purpose of the present disclosure is to achieve smooth rendezvous of a vehicle and a user even if there are numerous persons at a meeting point. A rendezvous assistance system includes a mobile terminal carried by a user who wants to rendezvous with a dispatched vehicle, and a rendezvous assistance device that assists rendezvous of the dispatched vehicle and the user at a meeting point. The rendezvous assistance device includes a message generator that generates a message that requests the user to do a gesture, a vehicle controller that determines timing of transmission of the message, and a vehicle communicator that transmits a message to the mobile terminal. The mobile terminal includes a mobile communicator that receives a message from the rendezvous assistance device and a notification unit that notifies the user of a request to do a gesture in accordance with the message.

16 Claims, 43 Drawing Sheets

(51) Int. Cl.
*G06Q 50/40* (2024.01)
*H04L 51/07* (2022.01)
*H04L 51/222* (2022.01)

(56) References Cited

U.S. PATENT DOCUMENTS

| | | | |
|---|---|---|---|
| 11,221,627 B2* | 1/2022 | Diehl | G05D 1/0088 |
| 11,240,663 B2* | 2/2022 | Akpinar | G06Q 50/40 |
| 2016/0103111 A1* | 4/2016 | Griffin | B60N 2/002 |
| | | | 73/25.01 |
| 2016/0275638 A1* | 9/2016 | Korpi | G06Q 50/40 |
| 2016/0308980 A1* | 10/2016 | Singh | H04L 67/148 |
| 2020/0124428 A1* | 4/2020 | Hamilton | G05D 1/0027 |
| 2020/0285240 A1* | 9/2020 | Diehl | B60W 60/00253 |
| 2020/0327317 A1* | 10/2020 | Park | G05D 1/021 |
| 2020/0334581 A1* | 10/2020 | Skaling | H04W 12/77 |
| 2020/0349666 A1* | 11/2020 | Hodge | G01C 21/3602 |
| 2020/0359214 A1* | 11/2020 | Akpinar | G06Q 50/40 |
| 2022/0128999 A1* | 4/2022 | Diehl | B60Q 1/507 |
| 2023/0332912 A1* | 10/2023 | Buttolo | G01C 21/3629 |

OTHER PUBLICATIONS

International Search Report (PCT/ISA/210) issued in PCT/JP2020/008012 mailed on Jun. 2, 2020.
Written Opinion (PCT/ISA/237) issued in PCT/JP2020/008012 mailed on Jun. 2, 2020.

* cited by examiner

F I G. 3
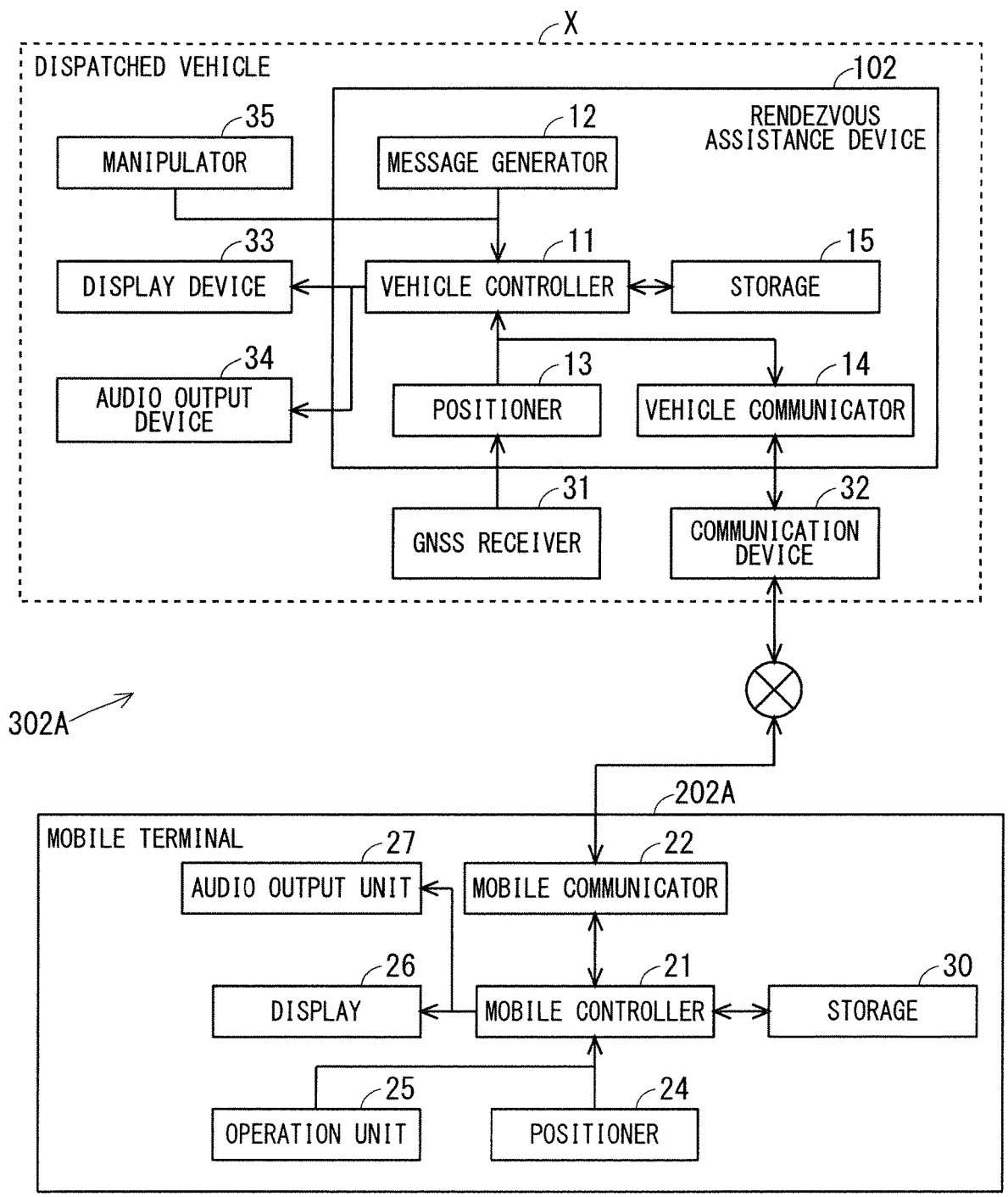

F I G. 5
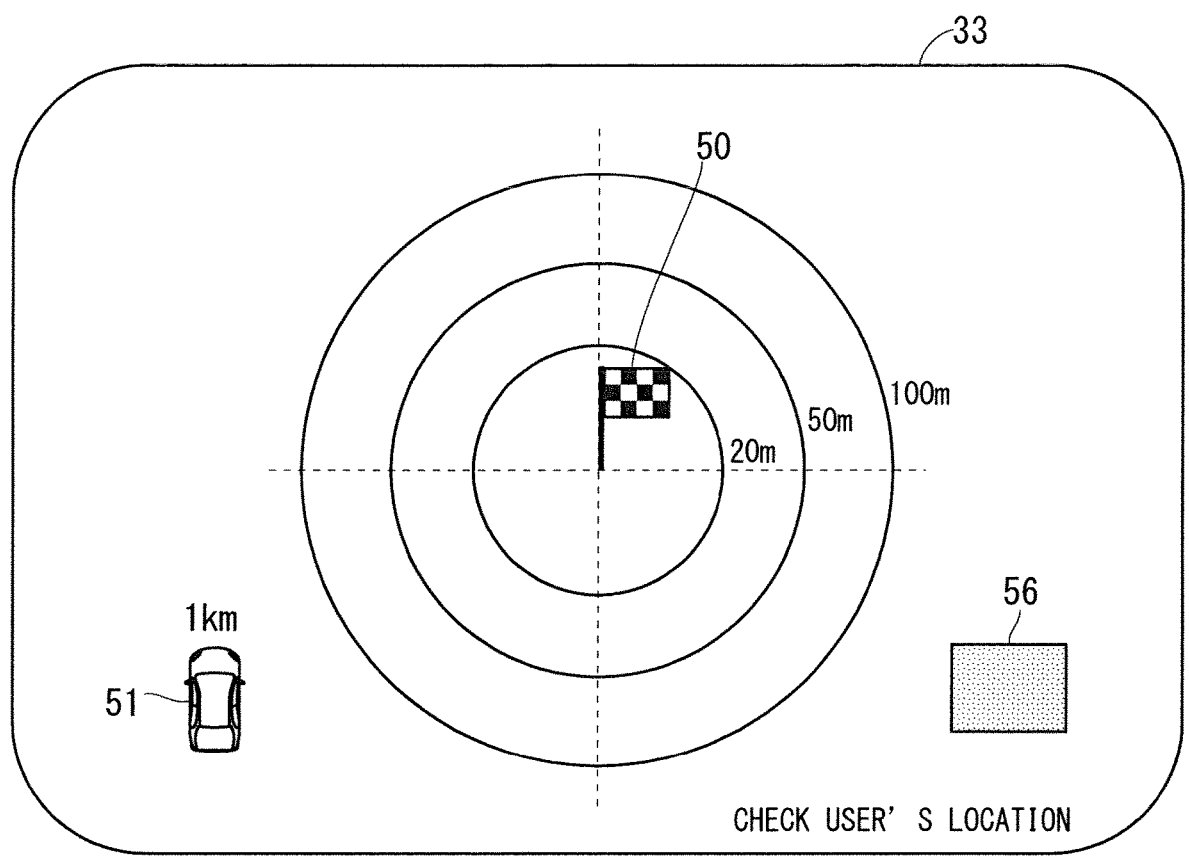

FIG. 9

| NUMBER | BODY-PART ATTRIBUTE | MOTION ATTRIBUTE |
|---|---|---|
| G1 | ONE HAND | RAISE |
| G2 | ONE HAND | RAISE AND WAVE |
| G3 | BOTH HANDS | RAISE |
| G4 | BOTH HANDS | RAISE AND WAVE |
| G5 | ONE FINGER | HOLD UP |
| G6 | ONE FINGER | HOLD UP AND WAVE |
| G7 | TWO FINGERS | RAISE |
| G8 | HAND(S) | PUT HANDS ON CHEST |
| G9 | FACE ONE HAND | TURN UPWARD RAISE AND WAVE |
| G10 | HAND(S) WHOLE BODY | RAISE WALK |

F I G. 3 3
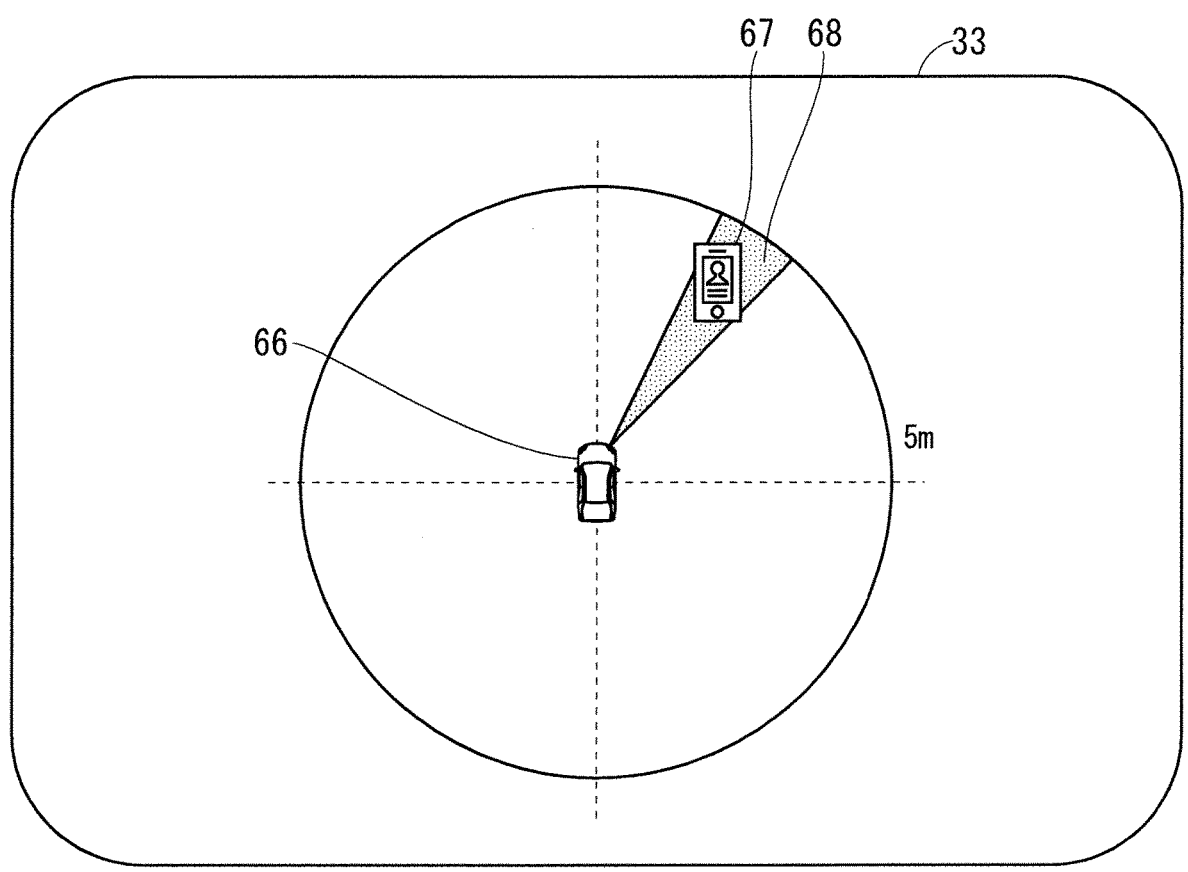

F I G. 39
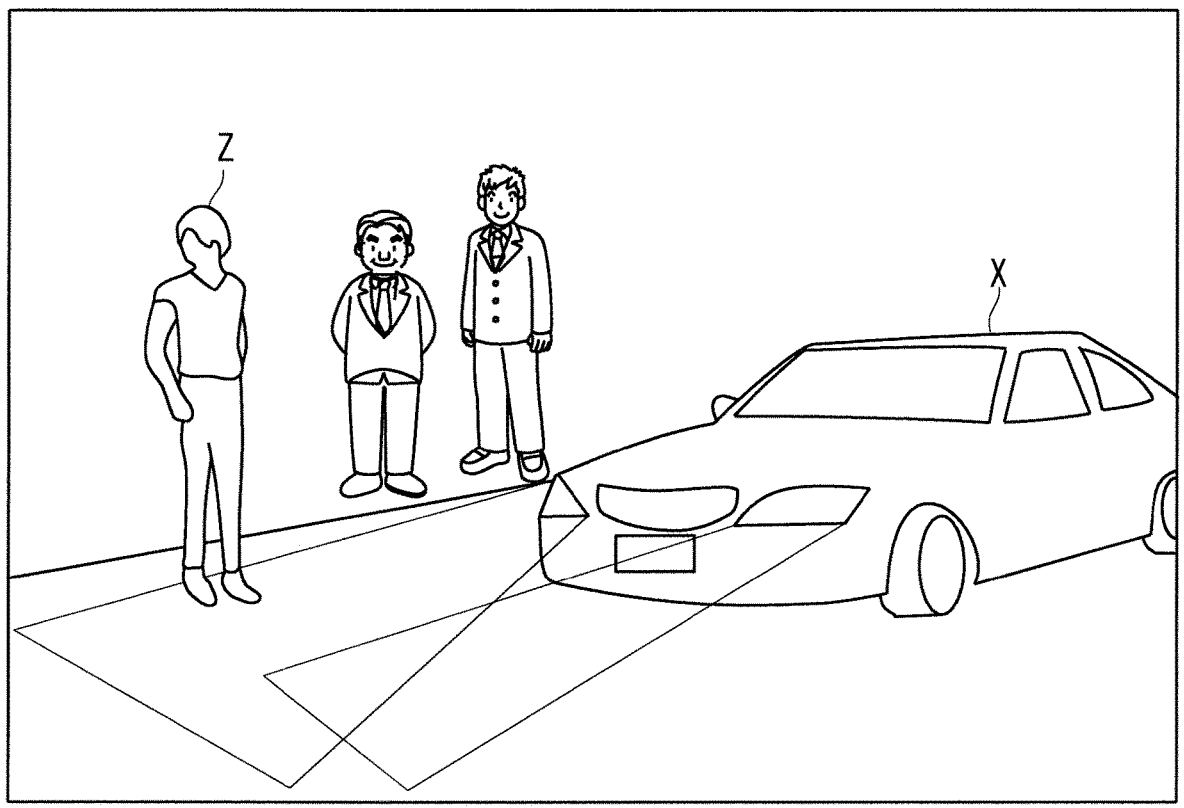

F I G. 4 2
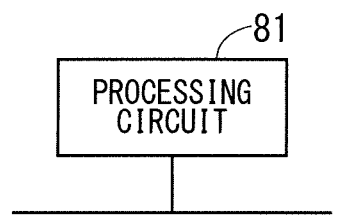

F I G. 4 3
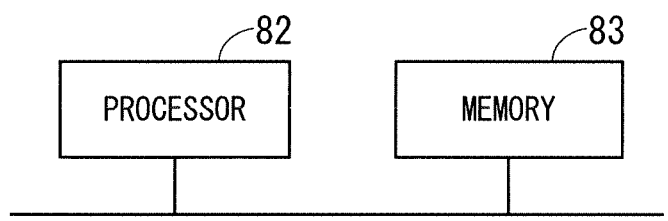

RENDEZVOUS ASSISTANCE SYSTEM AND RENDEZVOUS ASSISTANCE METHOD

TECHNICAL FIELD

The technique disclosed in the specification of the present disclosure aims at rendering possible smooth rendezvous of a dispatched vehicle and a user.

BACKGROUND ART

In recent years, the automobile industry has been commercializing various services using vehicle sharing as a keyword, or has been developing technology for vehicle sharing. For example, ride-hailing or ride-sharing services are vehicle dispatching services in which users can use a vehicle that they do not own.

With advances in automated operation technology, services are envisaged in which unattended vehicles go to pick users up by automatic operation.

These services are required to achieve smooth rendezvous of a user and a vehicle. In view of this, Patent Document 1 discloses a technique for assisting rendezvous by displaying a meeting place on a map.

PRIOR ART DOCUMENT

Patent Document 1: Japanese Patent Application Laid-Open No. 2019-053547

SUMMARY

Problems to be Solved by the Invention

With the technique of Patent Document 1, the vehicle is capable of recognizing a meeting point on the map. There is, however, a problem in that smooth rendezvous of a vehicle and a user is difficult to achieve because, if there are numerous persons at a meeting point, it can be difficult for the vehicle to recognize which person is its user.

The present disclosure has been made in light of the problem described above, and it is an object of the present disclosure to achieve smooth rendezvous of a vehicle and a user even if there are numerous persons at a meeting point.

Means to Solve the Invention

A rendezvous assistance system according to the present disclosure includes a mobile terminal carried by a user who wants to rendezvous with a dispatched vehicle, and a rendezvous assistance device that communicates with the mobile terminal and assists rendezvous of the dispatched vehicle and the user at a meeting point. The rendezvous assistance device includes a message generator that generates a message that requests the user to do a gesture, a vehicle controller that determines timing when the dispatched vehicle is at or around the meeting point as timing of transmission of the message, and a vehicle communicator that transmits the message to the mobile terminal with the timing of transmission. The mobile terminal includes a mobile communicator that receives the message from the rendezvous assistance device, and a notification unit that sends a notification that requests the user to do the gesture in accordance with the message.

Effects of the Invention

According to the technique described in the present disclosure, the mobile terminal sends a notification that requests the user to do a gesture with timing when the dispatched vehicle is at or around the meeting point. When the user has made a gesture in response to the notification, the vehicle is capable of identifying the user even if there are numerous persons at the meeting point. This achieves smooth rendezvous of the vehicle and the user.

BRIEF DESCRIPTION OF DRAWINGS

FIG. 3 is a block diagram illustrating a configuration of a rendezvous assistance system according to Embodiment 2.

FIG. 5 illustrates a positional-relationship display screen according to Embodiment 2.

FIG. 9 illustrates gesture information.

FIG. 33 shows an example of displaying the result of identifying the user by gesture recognition.

FIG. 39 shows an example of an announcement made via the outside-vehicle annunciator.

FIG. 42 illustrates a hardware configuration of the rendezvous assistance device and the communication terminal.

FIG. 43 illustrates a hardware configuration of the rendezvous assistance device and the communication terminal.

DESCRIPTION OF EMBODIMENTS

A. Embodiment 1

A-1. Configuration

Figure 1:
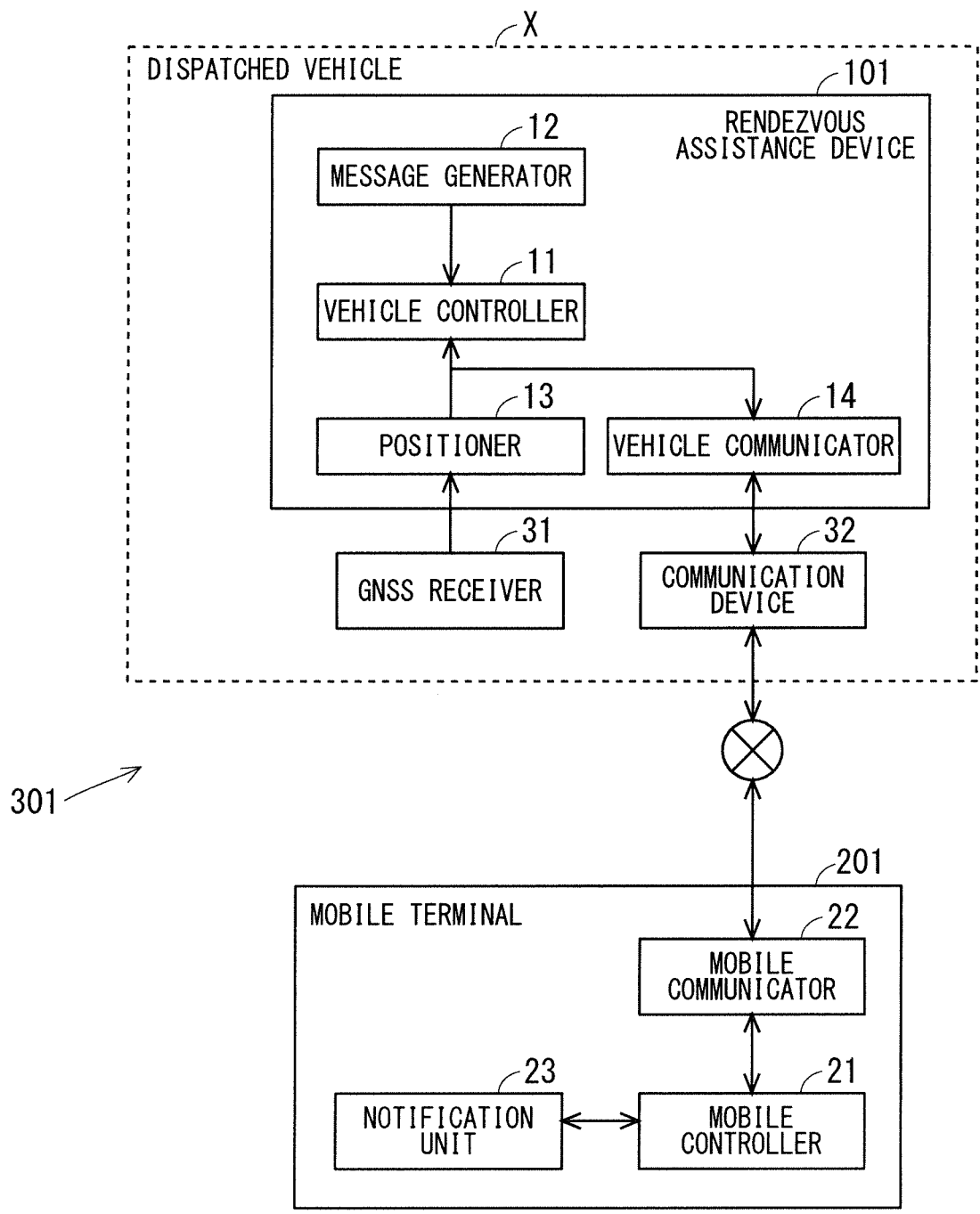
FIG. 1 is a block diagram illustrating a configuration of a rendezvous assistance system according to Embodiment 1.

FIG. 1 is a block diagram illustrating a configuration of a rendezvous assistance system 301 according to Embodiment 1. The rendezvous assistance system 301 assists smooth rendezvous of a dispatched vehicle X and a user who wants to rendezvous with the dispatched vehicle X. The rendezvous assistance system 301 includes a rendezvous assistance device 101 mounted on the dispatched vehicle X and a mobile terminal 201 of the user. Note that the rendezvous assistance device 101 may be a device mounted stationary on the dispatched vehicle X, or may be a mobile terminal that is brought and used in the dispatched vehicle X as necessary.

The rendezvous assistance device 101 includes a vehicle controller 11. a message generator 12, a positioner 13, and a vehicle communicator 14. The rendezvous assistance device 101 is connected to a global navigation satellite system (GNSS) receiver 31 and a communication device 32 that are mounted on the dispatched vehicle X, and is configured to be capable of using these devices.

The vehicle controller 11 performs overall control of the rendezvous assistance device 101. The message generator 12 generates a message that requests a user to do a gesture (hereinafter, simply referred to as the "message"). The GNSS receiver 31 receives a GNSS signal. The positioner 13 acquires a GNSS signal received by the GNSS receiver 31 and measures the location of the dispatched vehicle X on the basis of the GNSS signal. Note that the positioner 13 may measure the location of the dispatched vehicle X by other methods. The positioner 13 may correct the result of measuring the location of the dispatched vehicle X on the basis of the GNSS signal, for example in response to measurement signals obtained by a gyroscopic sensor and an acceleration sensor (not shown), or may further correct the measurement result by map matching.

The communication device 32 serves as a communication interface that allows the vehicle communicator 14 to communicate with the mobile terminal 201. The communication device 32 configures a communication network with a mobile communicator 22 of the mobile terminal 201. The vehicle communicator 14 transmits the message generated by the message generator 12 to the mobile terminal 201 via the communication device 32 when the dispatched vehicle X is at or around the meeting point. The message is transmitted for the purpose of causing the user to do a gesture and allowing the dispatched vehicle X to check this gesture and grasp the accurate location of the user. Accordingly, "the dispatched vehicle X is around the meeting point" described above means that the dispatched vehicle X or the driver is approaching the meeting point to the extent that the dispatched vehicle X or the driver is capable of checking the gesture of the user who is at the meeting point. For example, "being around the meeting point" may refer to "being within a 30-meter radius of the meeting point." Note that such information on the meeting point is shared in advance between the dispatched vehicle X and the user.

The mobile terminal 201 is a terminal carried by the user, and may for example be a PDA or a smartphone. The mobile terminal 201 includes a mobile controller 21, a mobile communicator 22, and a notification unit 23. The mobile controller 21 performs overall control of the mobile terminal 201. The mobile communicator 22 receives a message from the rendezvous assistance device 101. The notification unit 23 sends a notification that requests the user to do a gesture (hereinafter, referred to as a "gesture request notification") on the basis of the message received by the mobile communicator 22. The gesture request notification may be provided, for example, in at least one of forms including a display, audio, and vibrations depending on output means included in the mobile terminal 201.

A-2. Operations

Figure 2:
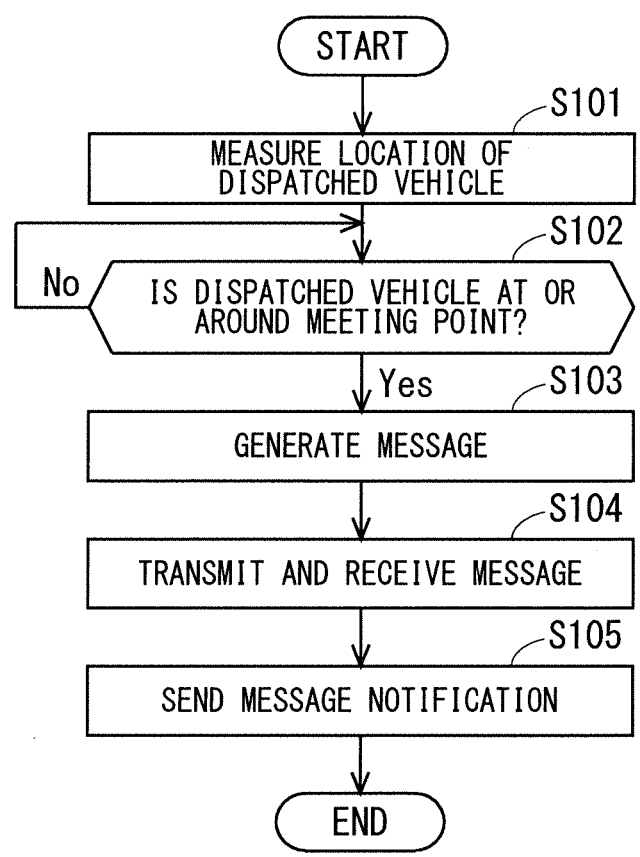
FIG. 2 is a flowchart illustrating operations of the rendezvous assistance system according to Embodiment 1.

FIG. 2 is a flowchart illustrating operations of the rendezvous assistance system 301. It is assumed that, before the start of this flowchart, the rendezvous assistance device 101 and the mobile terminal 201 share information on a meeting point in advance as a result of, for example, the conclusion of a vehicle dispatch contract between the dispatched vehicle X and the user.

First, in the rendezvous assistance device 101, the positioner 13 acquires a GNSS signal from the GNSS receiver 31 and measures the location of the dispatched vehicle X (step S101). The vehicle controller 11 acquires the location of the dispatched vehicle X from the positioner 13 and determines whether the dispatched vehicle X is at or around the meeting point (step S102). The vehicle controller 11 repeats step S102 until the answer in step S102 turns to "Yes."

When, the dispatched vehicle X is at or around meeting point in step S102, the message generator 12 generates a message that requests the user to do a gesture (step S103). Then, the vehicle communicator 14 transmits the message generated by the message generator 12 to the mobile terminal 201 via the communication device 32, and the message is received by the mobile terminal 201 (step S104).

Next, in the mobile terminal 201, the notification unit 23 sends the message received by the mobile communicator 22 as a notification to the user (step S105). When the user makes a gesture upon receipt of this notification, the dispatched vehicle X is capable of checking this gesture and accurately grasping the location of the user, In particular, even if there are numerous persons at the meeting point, the dispatched vehicle X is capable of identifying the user who is making the gesture as its user. This achieves smooth rendezvous of the dispatched vehicle X and the user.

A-3. Effects

The rendezvous assistance system 301 according to Embodiment I includes the mobile terminal 201 carried by the user who wants to rendezvous with the dispatched vehicle X, and the rendezvous assistance device 101 that assists rendezvous of the dispatched vehicle X and the user at a meeting point by communication with the mobile terminal 201. The rendezvous assistance device 101 includes the message generator 12 that generates a message that requests the user to do a gesture, the vehicle controller 11 that determines timing when the dispatched vehicle X is at or around the meeting point as the timing of transmission of the message, and the vehicle communicator 14 that transmits the message to the mobile terminal with the determined timing of transmission. The mobile terminal 201 includes the mobile communicator 22 that receives a message from the rendezvous assistance device 101, and the notification unit 23 that sends a notification that requests the user to do a gesture on the basis of the message. When the dispatched vehicle X is at or around the meeting point, the mobile terminal 201 sends a notification that requests the user to do a gesture to the dispatched vehicle X, and the user makes a gesture in response to this notification, Thus, the dispatched vehicle X is capable of identifying the user even if there are numerous persons at the meeting point. This achieves smooth rendezvous of the dispatched vehicle X and the user.

B. Embodiment 2

B-1. Configuration

FIG. 3 is a block diagram illustrating a configuration of a rendezvous assistance system 302A according to Embodiment 2. The rendezvous assistance system 302A includes a rendezvous assistance device 102 mounted on a dispatched vehicle X and a mobile terminal 202A. The rendezvous assistance device 102 is connected to a GNSS receiver 31, a communication device 32, a display device 33, an audio output device 34, and a manipulator 35 that are mounted on the dispatched vehicle X, and is configured to be capable of using these devices.

The rendezvous assistance device 102 includes a storage 15 in addition to the configuration of the rendezvous assistance device 101 according to Embodiment 1. The storage 15 stores location information on a meeting point. In addition to this, the storage 15 may further store identification information on the user. The vehicle controller 11 of the rendezvous assistance device 102 is connected to the display device 33, the audio output device 34, and the manipulator 35.

The display device 33 and the audio output device 34 serve as output interfaces for the driver of the dispatched vehicle X. The display device 33 may be configured with, for example, a liquid crystal display, an organic EL display, or an HUD. The audio output device 34 may be configured with a speaker. The manipulator 35 serves as an input interface for the driver of the dispatched vehicle X and is configured with, for example, a touch panel, mechanical switches, or an audio input device.

The mobile terminal 202A includes, in addition to the configuration of the mobile terminal 201 according to Embodiment 1, a positioner 24, an operation unit 25, and a storage 30. The storage 30 stores location information on a meeting point. In addition to this, the storage 30 may further store identification information on the dispatched vehicle X such as vehicle type, color, and registration number. The mobile terminal 202A further includes a display 26 and an audio output unit 27 that serve as a notification unit.

The positioner 24 measures the location of the mobile terminal 202A by a method similar to that used by the positioner 13 of the rendezvous assistance device 102. The operation unit 25 serves as an input interface of the mobile terminal 202A and may be configured with, for example, a touch panel, mechanical switches, or an audio input device. The display 26 may be configured with, for example, a liquid crystal display or an organic EL display. the audio output unit 27 may be configured with a speaker.

B-2. Operations

Figure 4:
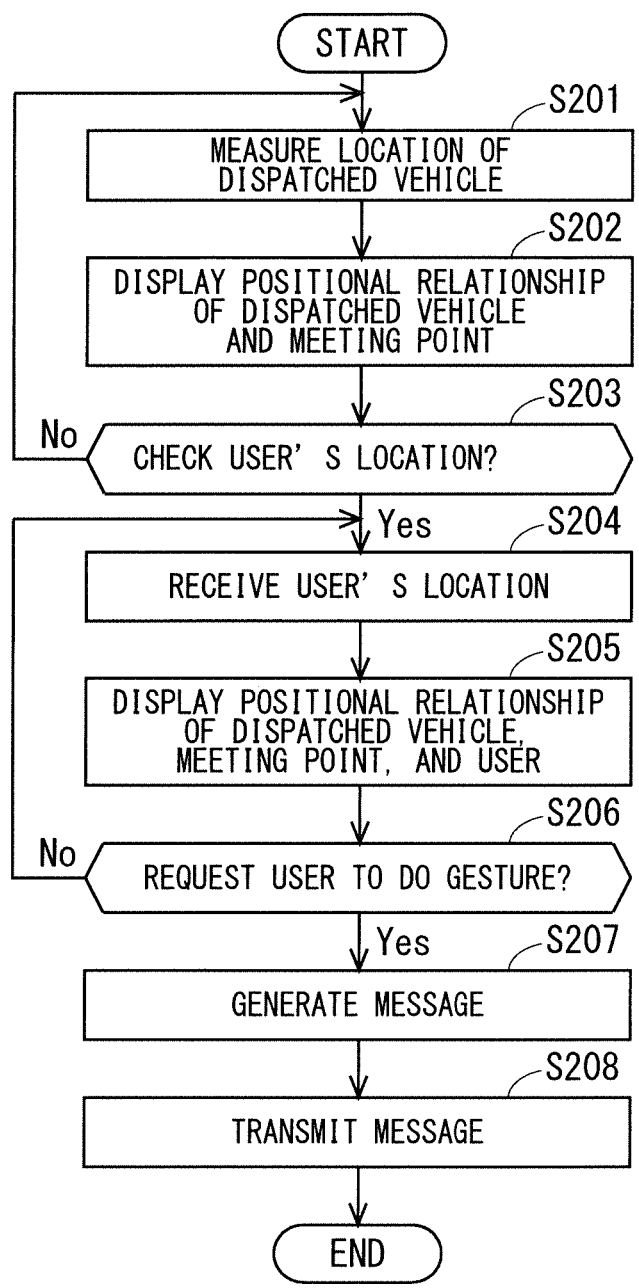
FIG. 4 is a flowchart illustrating operations of the rendezvous assistance device according to Embodiment 2.

FIG. 4 is a flowchart illustrating operations of the rendezvous assistance device 102. It is assumed that, before the start of this flowchart, the rendezvous assistance device 102 and the mobile terminal 202A share information on a meeting point as a result of, for example, the conclusion of a vehicle dispatch contract between the dispatched vehicle X and a user. Thus, the storage 15 of the rendezvous assistance device 102 and the storage 30 of the mobile terminal 202A store the location information on the meeting point. Hereinafter, the operations of the rendezvous assistance device 102 will be described with reference to the flowchart in FIG. 4.

When the dispatched vehicle X has started travelling to the meeting point, the positioner 13 acquires a GNSS signal from the GNSS receiver 31 and measures the location of the dispatched vehicle X (step S201). Then the vehicle controller 11 acquires the location information on the meeting point from the storage 15, acquires the location information on the dispatched vehicle X from the positioner 13, and on the bases of the received information, displays a positional relationship of the dispatched vehicle X and the meeting point on the display device 33 (step S202).

FIGS. 5 to 8 show examples of a positional-relationship display screen of the display device 33 that displays the positional relationship of the dispatched vehicle X and the meeting point. In the example illustrated in FIG. 5, the location of the meeting point is indicated by an object 50, and the location of the dispatched vehicle X is indicated by an object 51. The positional relationship of the objects 50 and 51 indicates the distance and direction between the meeting point and the dispatched vehicle X. A plurality of concentric circles about the object 50 indicate distances from the meeting point. In the example illustrated in FIG. 5, the concentric circles that respectively indicate the distances of 20 m, 50 m, and 100 m from the meeting point are displayed. Also, the distance of the dispatched vehicle X from the meeting point is added to the object 51. In the example illustrated in FIG. 5, the dispatched vehicle X is 1 km away from the meeting point and therefore the object 51 is displayed outside the largest concentric circle.

Referring back to the flowchart in FIG. 4, the vehicle controller 11 determines whether to check the location of the user (step S203). As illustrated in FIG. 5, an icon 56 for displaying the location of the user is displayed on the positional-relationship display screen. The driver who wants to check the location of the user presses the icon 56. In the condition illustrated in FIG. 5, the vehicle is far away from the meeting point and therefore there is little need to check the location of the user. If the driver has not pressed the icon 56 for a given period of time, the vehicle controller 11 determines that there is no need to check the location of the user. Thus, the processing of the rendezvous assistance device 102 returns to step S201, and the positional-relationship display screen is updated in the subsequent step S202.

Figure 6:
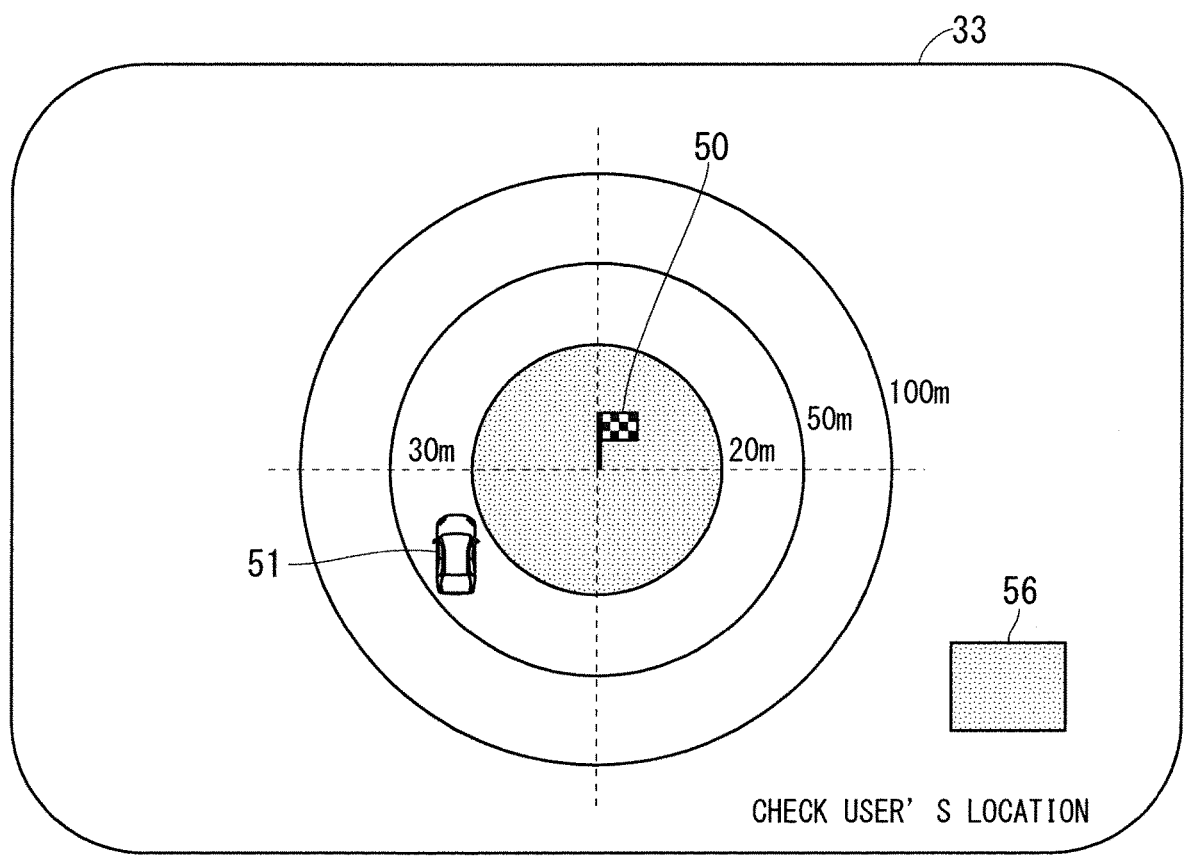
FIG. 6 illustrates the positional-relationship display screen according to Embodiment 2.

FIG. 6 illustrates the positional-relationship display screen when the dispatched vehicle X is approaching 30 m from the meeting point. In FIG. 6, the object 51 is displayed inside a concentric circle that represents a distance of 50 m from the meeting point. The inside of the smallest concentric circle that represents a distance of 20 m from the meeting point is displayed in a different color from the other concentric circles and expresses that the dispatched vehicle X is approaching the meeting point.

Figure 7:
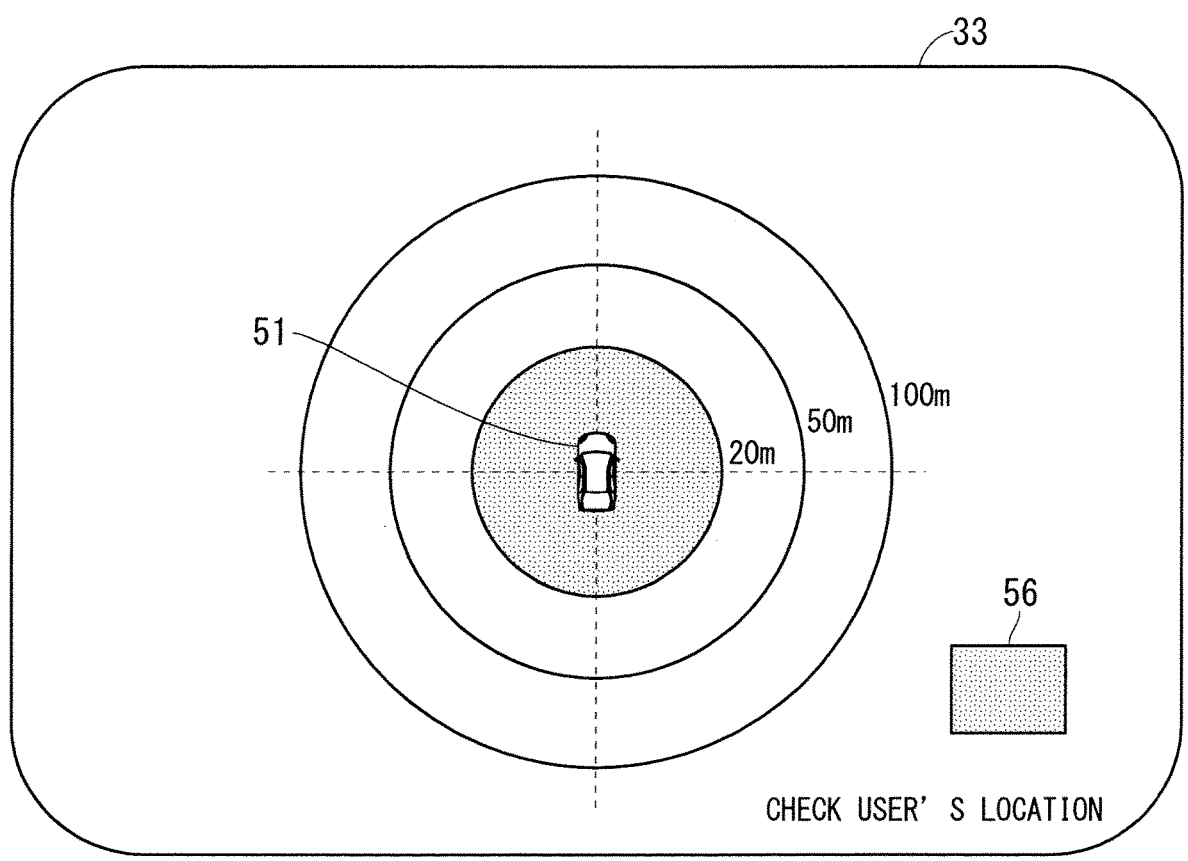
FIG. 7 illustrates the positional-relationship display screen according to Embodiment 2.

FIG. 7 illustrates the positional-relationship display screen when the dispatched vehicle X has arrived at the meeting point, without the driver pressing the icon 56 on the positional-relationship display screen in FIG. 6. In FIG. 7, the object 51 is displayed in the center of the concentric circles, and the object 50 is not displayed. When the dispatched vehicle X has arrived at the meeting point, the driver needs to check whether the user also has arrived at the meeting point.

When the driver has pressed the icon 56, operation information on the icon 56 is input from the manipulator 35 to the vehicle controller 11, and the vehicle controller 11 determines to check the location of the user (Yes in step S203). Then, the vehicle communicator 14 sends a request to transmit the location information to the mobile terminal 202A and receives location information on the mobile terminal 202A as the location information on the user from the mobile terminal 202A (step S204). Then, the vehicle controller 11 causes the display device 33 to display the positional relationship of the dispatched vehicle X and the meeting point (step S205). The location of the user as used herein is synonymous with the location of the mobile terminal 202A. In this way, the vehicle controller 11 acquires the operation information on the driver of the dispatched vehicle X and causes the display device 33 to display the positional relationship of the dispatched vehicle X, the meeting point, and the user with timing based on the operation information on the driver.

Figure 8:
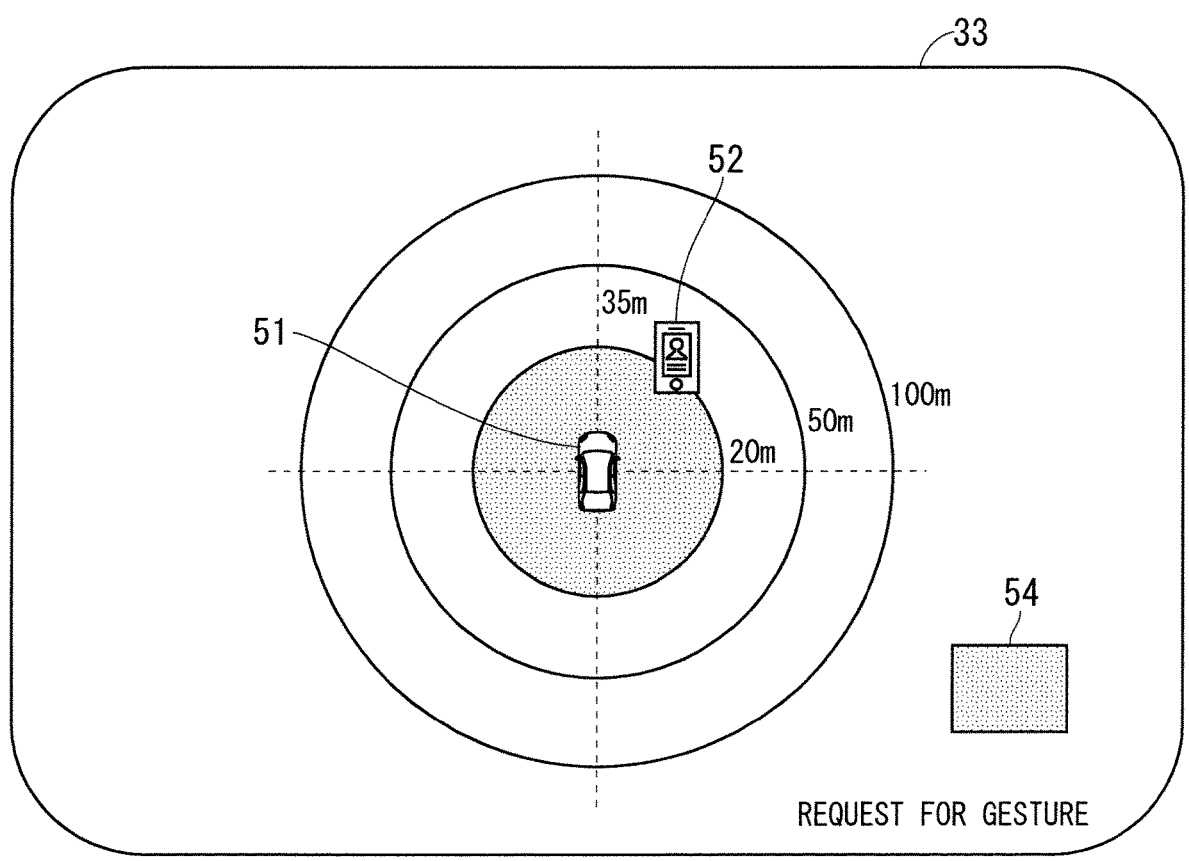
FIG. 8 illustrates the positional-relationship display screen according to Embodiment 2.

FIG. 8 shows an example of the positional-relationship display screen on the display device 33 in step S205. In FIG. 8, in addition to the display in FIG. 7, the location of the user is indicated by an object 52. Also, a distance of 35 m between the user and the meeting point is added to the object 52. This display enables the driver to grasp that the user is at a location 35 m of from the dispatched vehicle X in the upper right direction.

Then, the vehicle controller 11 determines whether or not to request the user to do a gesture (step S206). The positional-relationship display screen illustrated in FIG. 8 displays an icon 54 for requesting the user to do a gesture. The driver grasps the location of the user by looking at the positional-relationship display screen and presses the icon 54 when having determined that the user is at a viewable location from the dispatched vehicle X. If the driver has not pressed the icon 54 for a given period of time, the vehicle controller 11 determines not to request the user to do a gesture. Thus, the processing of the rendezvous assistance device 102 returns to step S204, and the positional-relationship display screen is updated in the subsequent step S205.

When the driver has pressed the icon 54, operation information on the icon 54 is input from the manipulator 35 to the vehicle controller 11, and the vehicle controller 11 determines to request the user to do a gesture (Yes in step S206). Then, the message generator 12 selects one gesture from among a plurality of gestures prepared in advance, and generates a message that prompts the user to do the selected gesture (step S207). In this way, the timing of generation of the message is determined by the driver's operation. Then, when the message is generated as will be described later, the message is transmitted to the mobile terminal 202A. In other words, the timing of transmission of the message is determined by the timing based on information on the driver's operation.

Figure 10:
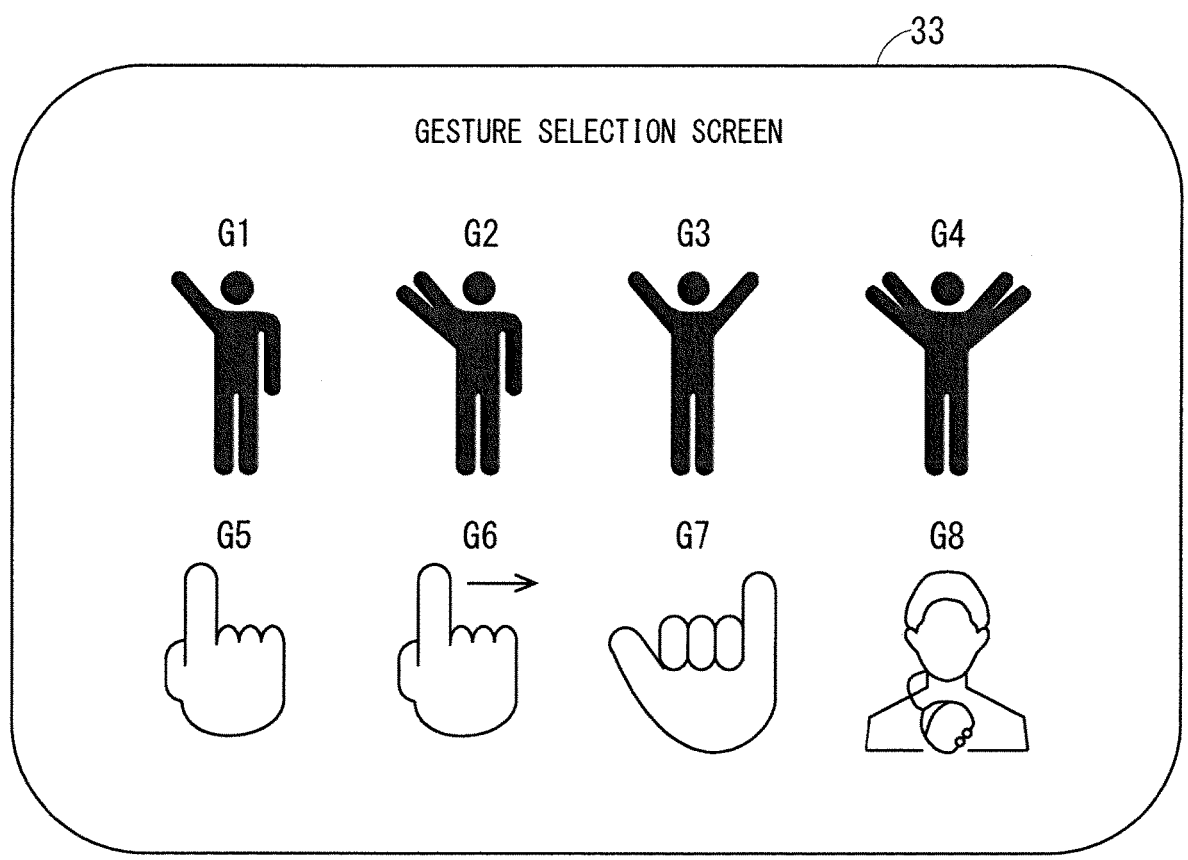
FIG. 10 illustrates a gesture selection screen.

FIG. 9 illustrates gesture information stored in storage 15. The gesture information is information on candidates for the gesture requested to the user to do, and includes an identification number, body-part attribute, and motion attribute of each gesture. The body-part attribute is information that indicates the body part that makes the gesture, and the motion attribute is information that indicates how the body part indicated by the body-part attribute is moved. On the basis of the gesture information, the vehicle controller 11 causes the display device 33 to display a gesture selection screen for allowing the driver to select a gesture. FIG. 10 shows one example of the gesture selection screen. This gesture selection screen displays icons that visually represent gestures with identification numbers G1 to G8 (hereinafter, referred to as "gestures G1 to G8"), and the driver selects an icon to select a gesture type that the driver requests the user to do. For example, when the driver has selected the gesture G1, the message generator 12 generates a message saying "Please raise one hand." This message may include an icon that visually expresses the gesture, in addition to the text saying "Please raise one hand."

Although the driver selects a gesture from among a plurality of candidates prepared in advance in the above description, the method of generating a message is not limited thereto. For example, the driver may set a new gesture by designating a body-part attribute and a motion attribute. As another alternative, the rendezvous assistance device 102 and the mobile terminal 202A may prescribe a gesture to be required for rendezvous when concluding a vehicle dispatch contract.

When the message generator 12 has generated a message, the vehicle communicator 14 transmits the message to the mobile terminal 202A (step S208). In this way, the operations of the rendezvous assistance device 102 end.

Next, operations of the mobile terminal 202A will be described with reference to the flowchart in FIG. 11. First, the positioner 24 measures the location of the mobile terminal 202A (step S301). Then, the mobile controller 21 acquires location information on the meeting point from the storage 30 and acquires the location information on the mobile terminal 202A from the positioner 24. On the basis of the acquired information, the mobile controller 21 causes the display 26 to display a positional relationship of the mobile terminal 202A and the meeting point (step S302). Here, the positional-relationship display screen displayed on the display 26 may be obtained by, for example, replacing the dispatched vehicle X with the mobile terminal 202A on the display of the positional relationship of the dispatched vehicle X and the meeting point illustrated in, for example, FIGS. 5 to 7.

Then, the mobile controller 21 determines whether a request to transmit location information is sent from the dispatched vehicle X (step S303). This request-to-transmit is sent from the rendezvous assistance device 102 to the mobile terminal 202A in step S204 in FIG. 4. Upon receipt of a request to transmit location information from the dispatched vehicle X, the mobile communicator 22 transmits the location information on the mobile terminal 202A to the dispatched vehicle X (step S304). This location information is received by the vehicle communicator 14 of the rendezvous assistance device 102 via the communication device 32.

After step S304 or if the request to transmit location information is not received from the dispatched vehicle X in step S303, the mobile controller 21 determines whether the mobile communicator 22 has received a message from the dispatched vehicle X (step S305). When the mobile communicator 22 has not received a message from the dispatched vehicle X in step S305, the processing of the mobile terminal 202A returns to step S301. When the mobile communicator 22 has received a message from the dispatched vehicle X in step S305, the display 26 and the audio output unit 27 send a message notification to the user (step S306). In this way, the operations of the mobile terminal 202A end.

Figure 12:
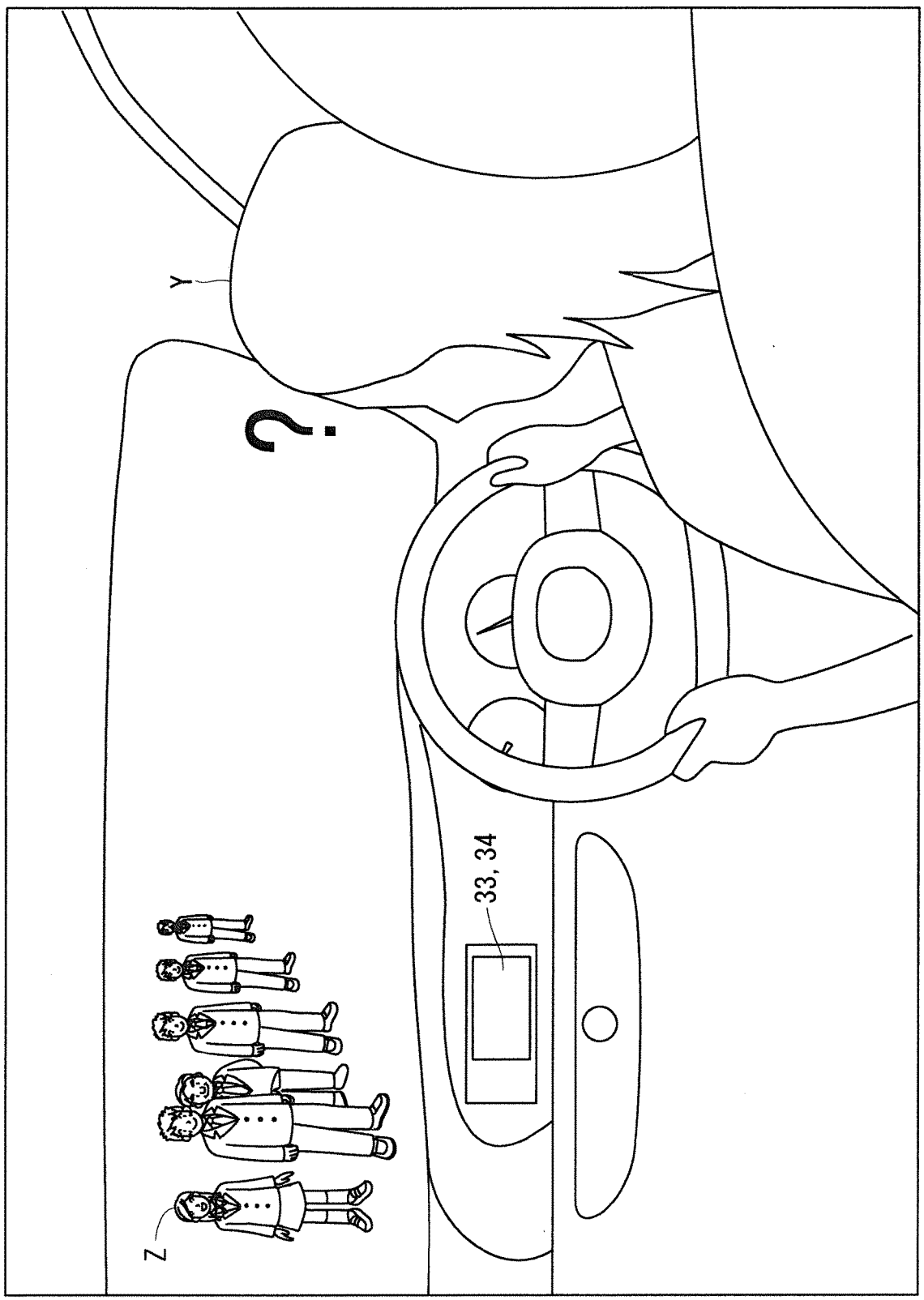
FIG. 12 illustrates a condition in which there are numerous persons at a meeting point and the driver is unable to identify his/her user
Figure 13:
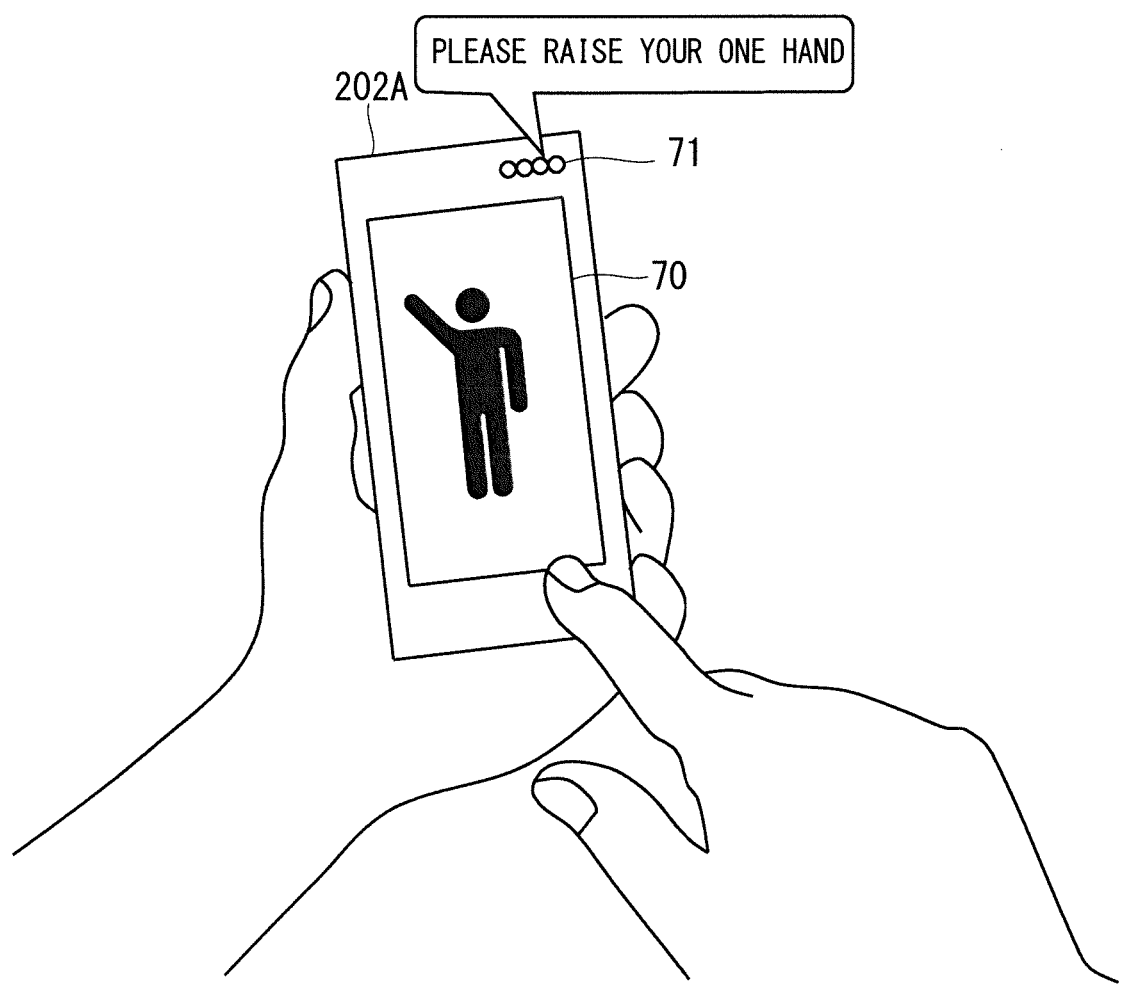
FIG. 13 shows an example of a notification on the mobile terminal that has received a message from the rendezvous assistance device.
Figure 14:
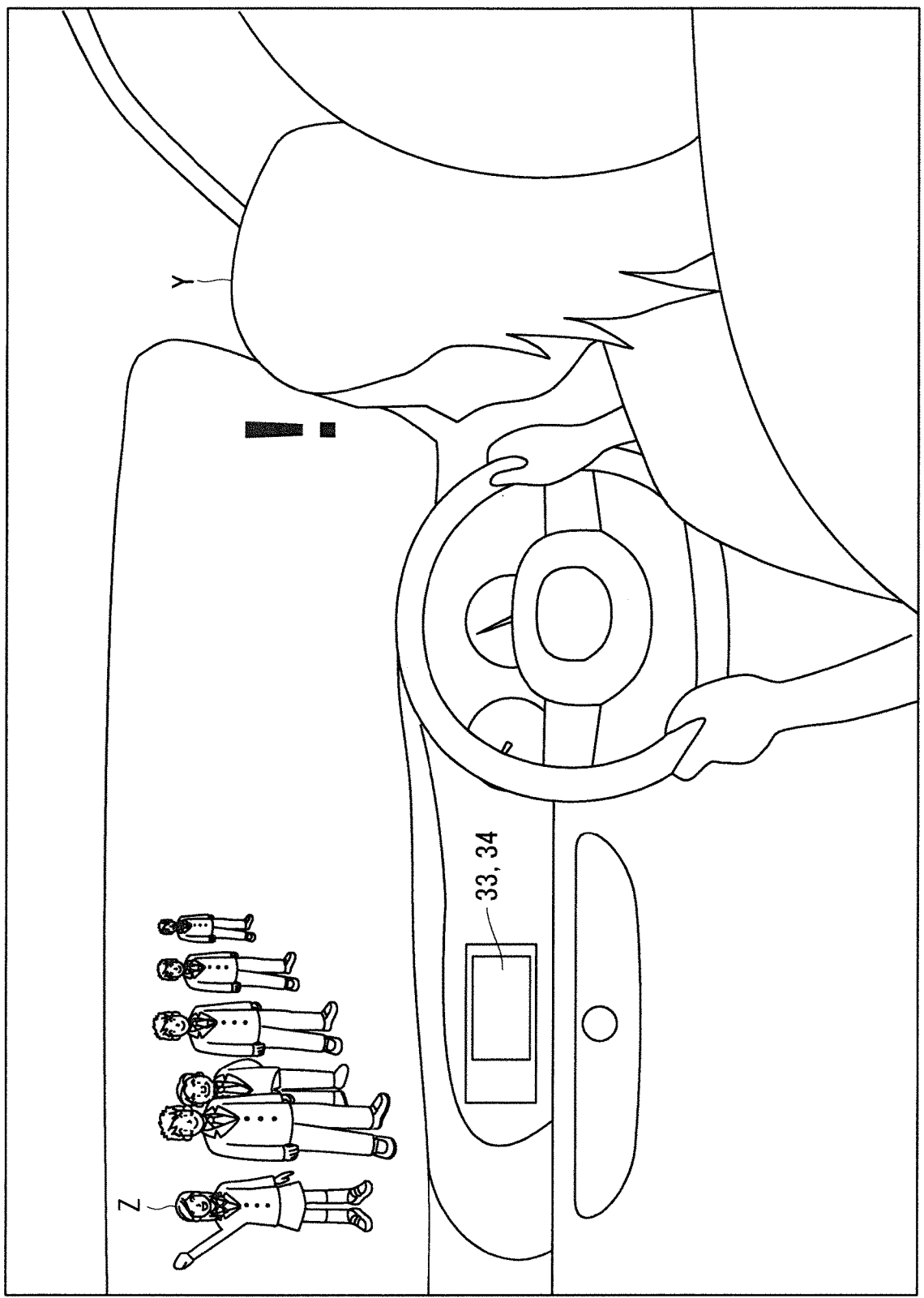
FIG. 14 illustrates a condition in which the driver identifies the user by the gesture of the user.

The procedure from when the dispatched vehicle X has arrived at the meeting point to when the user makes a gesture will be described with reference to FIGS. 12 to 14. In FIGS. 12 and 14, the user is indicated by a reference sign Z. The gesture type is assumed to be "raise one hand."

FIG. 12 illustrates a situation in which the dispatched vehicle X has arrived at the meeting point, but a driver Y is unable to identify a user Z because there are numerous persons at the meeting point. In this case, the rendezvous assistance device 02 transmits a message to the mobile terminal 202A, and thereby the mobile terminal 202A notifies the user of the message that requests the user to do a gesture. In the example illustrated in FIG. 13, an icon that indicates the gesture of raising one hand is displayed on the display 70 of the mobile terminal 202A, and a voice saying "Please raise one hand" is output from a speaker 71 of the mobile terminal 202A. In this example, both a display and audio are used as a message notification, but either one of them may be used or vibration may be added as a message notification. When the user Z has made the gesture of raising one hand in response to the notification, the driver Y is able to identify the user Z from among the numerous persons as illustrated in FIG. 14. Then, the driver Y drives the dispatched vehicle X to just in front of the user Z and achieves smooth rendezvous with the user Z.

B-3. Variation 1

Figure 15:
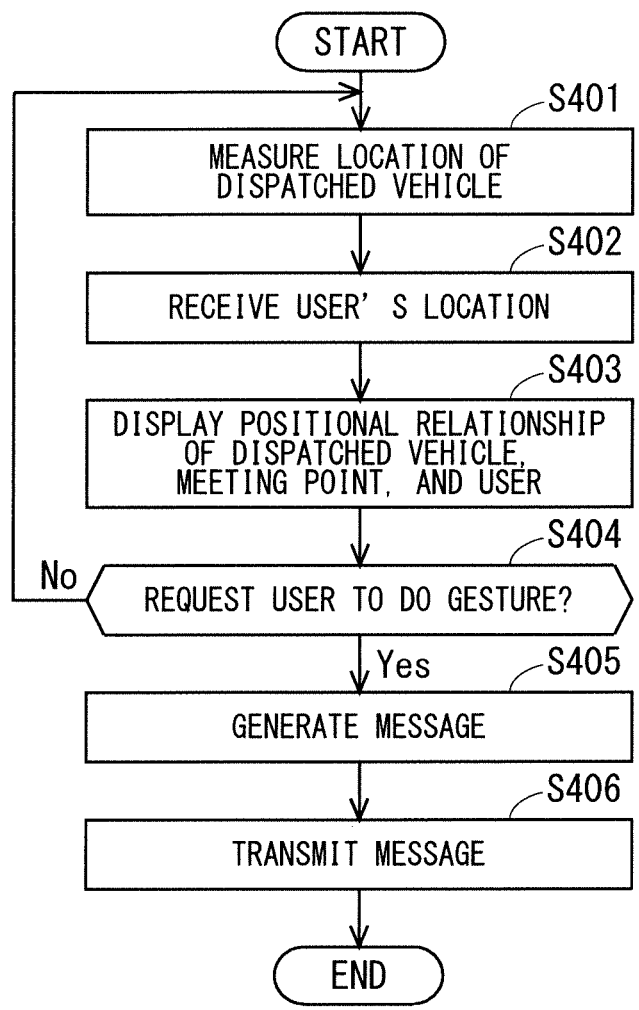
FIG. 15 is a flowchart illustrating operations of a rendezvous assistance device according to Variation 1 of Embodiment 2.

In the flowchart illustrated in FIG. 4, the rendezvous assistance device 102 causes the driver to determine the timing of checking the location of the user in step S203. Alternatively, the rendezvous assistance device 102 may cause the display device 33 to display the location of the user from the beginning. FIG. 15 is a flowchart of such processing of the rendezvous assistance device 102 according to a variation. In this flowchart, after the positioner 13 has measured the location of the dispatched vehicle X (step S401), the vehicle communicator 14 acquires the location of the user from the mobile terminal 202A (step S402). Then, the vehicle controller 11 causes the display device 33 to display a positional relationship of the dispatched vehicle X, the meeting point, and the user (step S403). The subsequent steps S404 to S406 are the same as steps S206 to S208 in FIG. 4.

Figure 16:
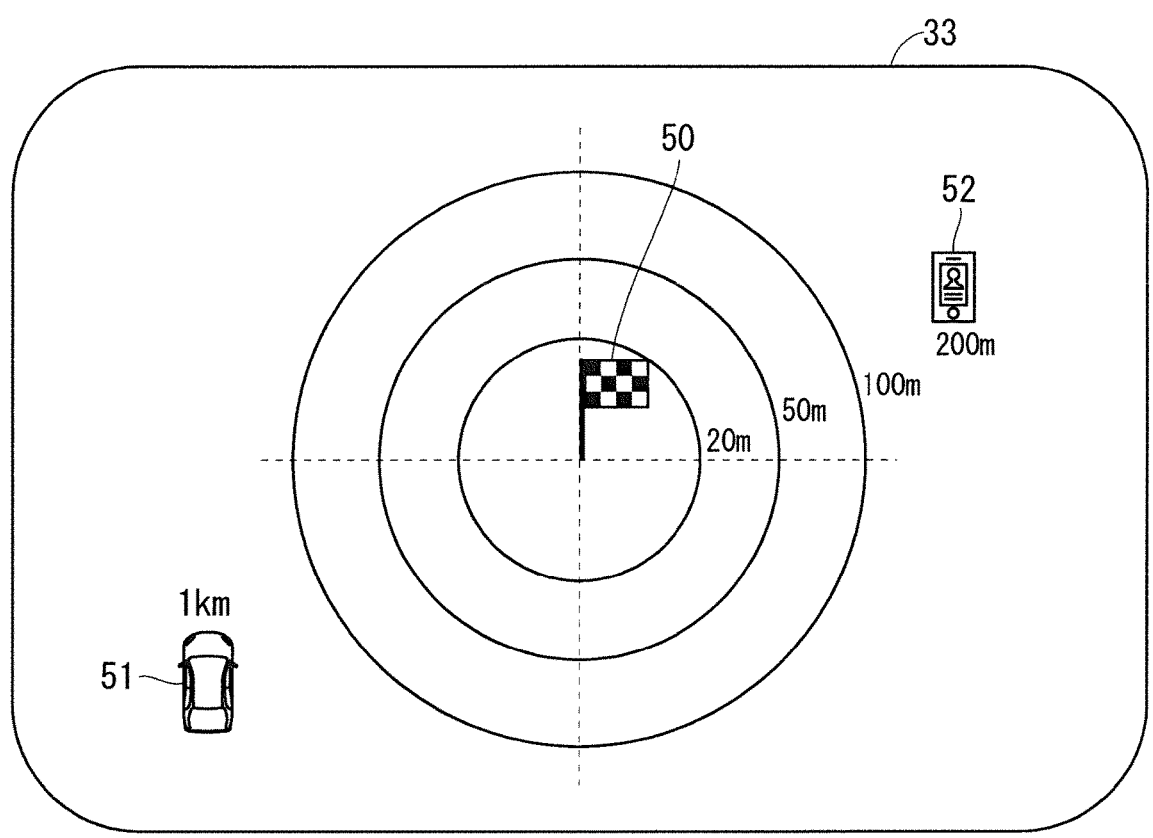
FIG. 16 illustrates a positional-relationship display screen according to Variation 1 of Embodiment 2.
Figure 17:
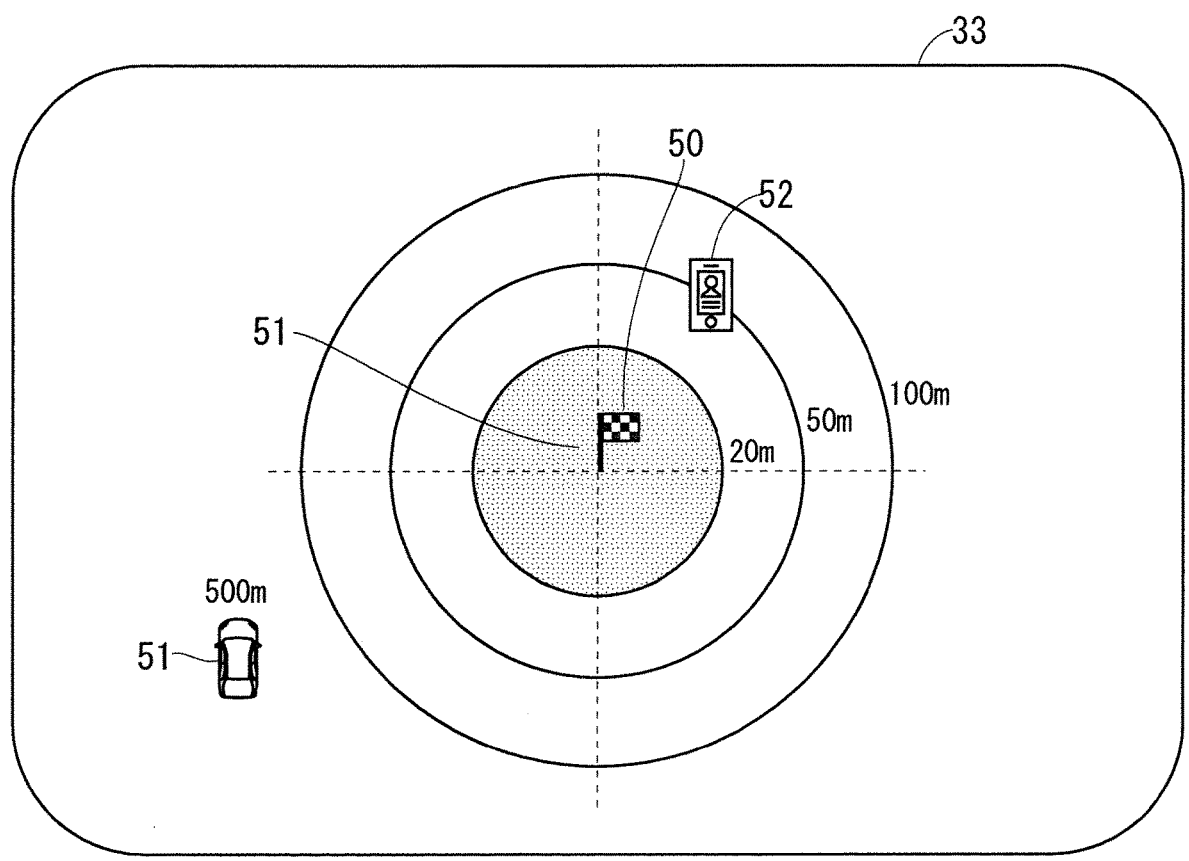
FIG. 17 illustrates the positional-relationship display screen according to Variation 1 of Embodiment 2.
Figure 18:
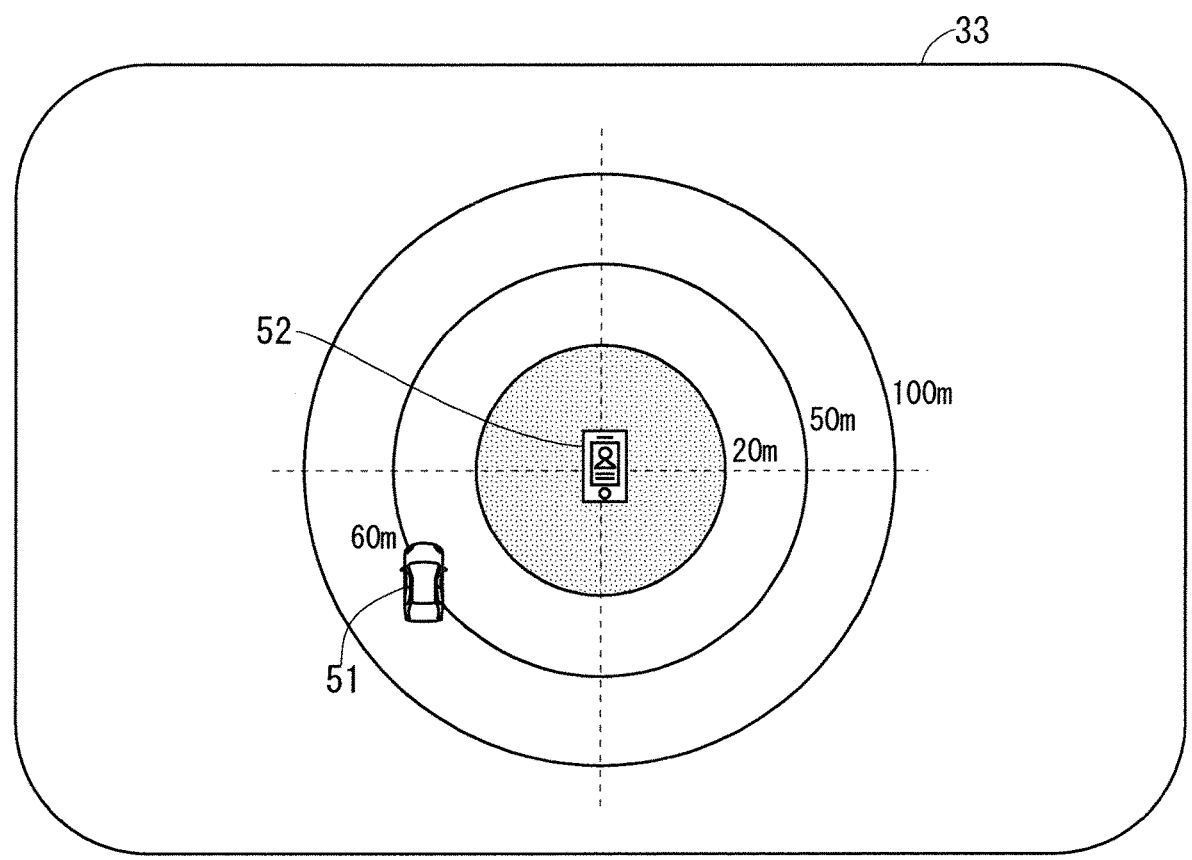
FIG. 18 illustrates the positional-relationship display screen according to Variation 1 of Embodiment 2.
Figure 19:
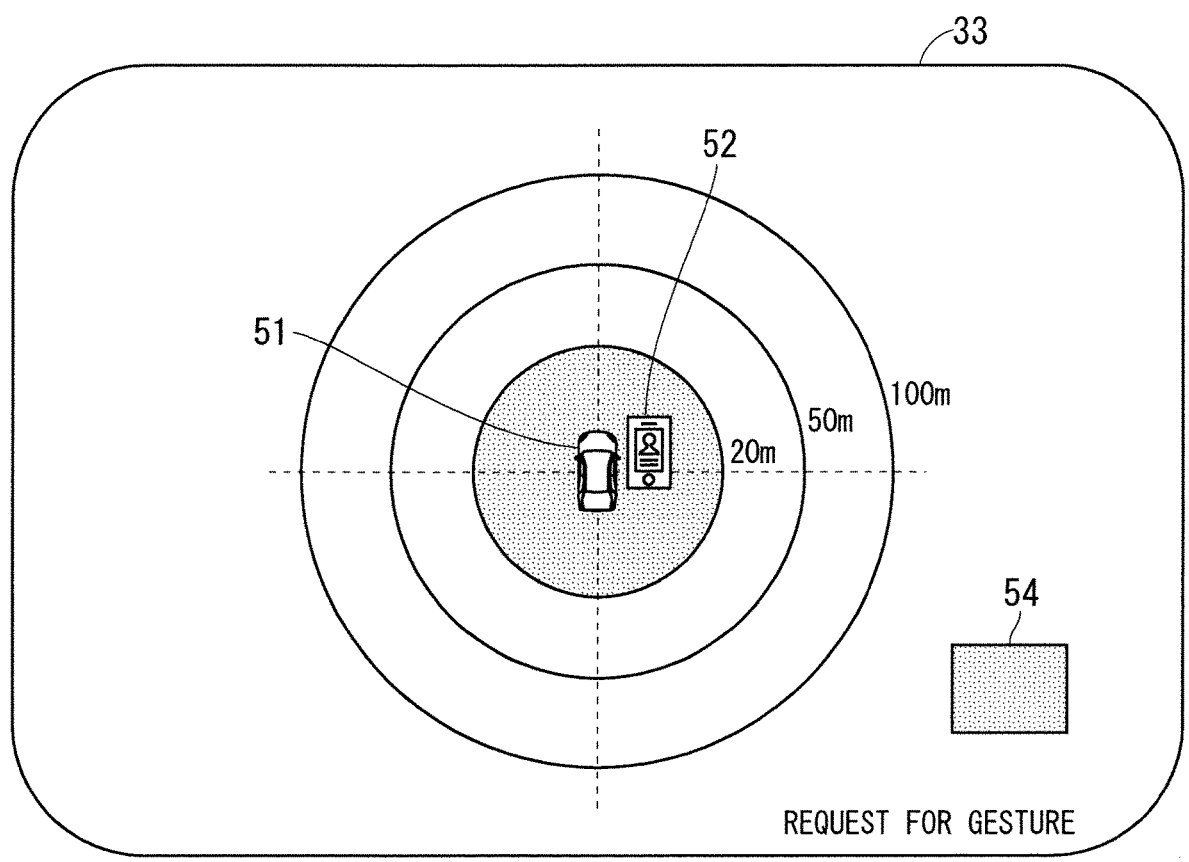
FIG. 19 illustrates the positional-relationship display screen according to Variation 1 of Embodiment 2.

FIGS. 16 to 19 show examples of displaying the positional relationship on the display device 33 according to this variation. In FIG. 16, the dispatched vehicle X is 1 km away from the meeting point, and the user is 200 m away from the meeting point. At this point in time, the object 52 indicating the location of the user is also displayed. In FIG. 17, the dispatched vehicle X is 500 m away from the meeting point, and the user is 70 m away from the meeting point. FIG. 18 shows an example of displaying the positional relationship at the time when the dispatched vehicle X is 60 m away from the meeting point and the user has arrived at the meeting point. In FIG. 18, the object 52 is displayed in the center of the concentric circles, and the object 50 representing the location of the meeting point is not displayed. FIG. 19 illustrates the positional-relationship display screen at the time when the dispatched vehicle X has arrived at the meeting point. This positional-relationship display screen displays an icon 54 for requesting the user to do a gesture.

The variation described with reference to FIGS. 15 to 19 increases the amount of communication between the rendezvous assistance device 102 and the mobile terminal 202A during transmission and reception of the location information on the user, but eliminates the need for the driver to perform the operation of determining the timing of checking the location of the user.

B-4. Variation 2

Figure 11:
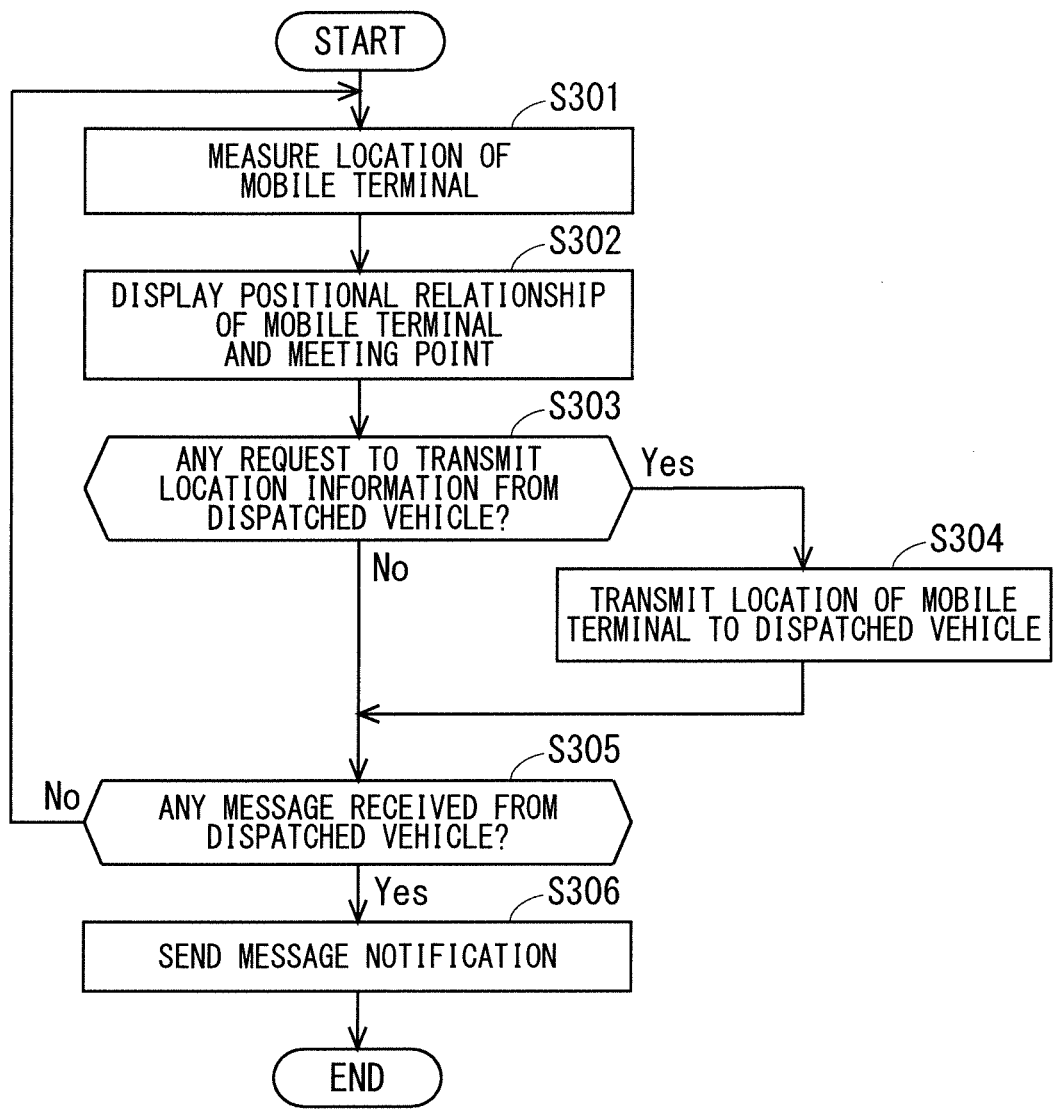
FIG. 11 is a flowchart illustrating operations of a mobile terminal according to Embodiment 2.

In step S302 in FIG. 11, the mobile terminal 202A displays the positional relationship of the meeting point and the mobile terminal 202A on the display 26. Alternatively, the mobile terminal 202A may acquire the location information on the dispatched vehicle X from the rendezvous assistance device 102 and display the positional relationship of the meeting point, the mobile terminal 202A, and the dispatched vehicle X on the display 26. This display may be obtained by, for example, interchanging the object 51 representing the location of the dispatched vehicle X with the object 52 representing the location of the user on the display of the positional relationship illustrated in FIG. 8. The timing of displaying the location of the dispatched vehicle X may be displayed from the beginning, or may be determined by a user operation.

B-5. Variation 3

Figure 20:
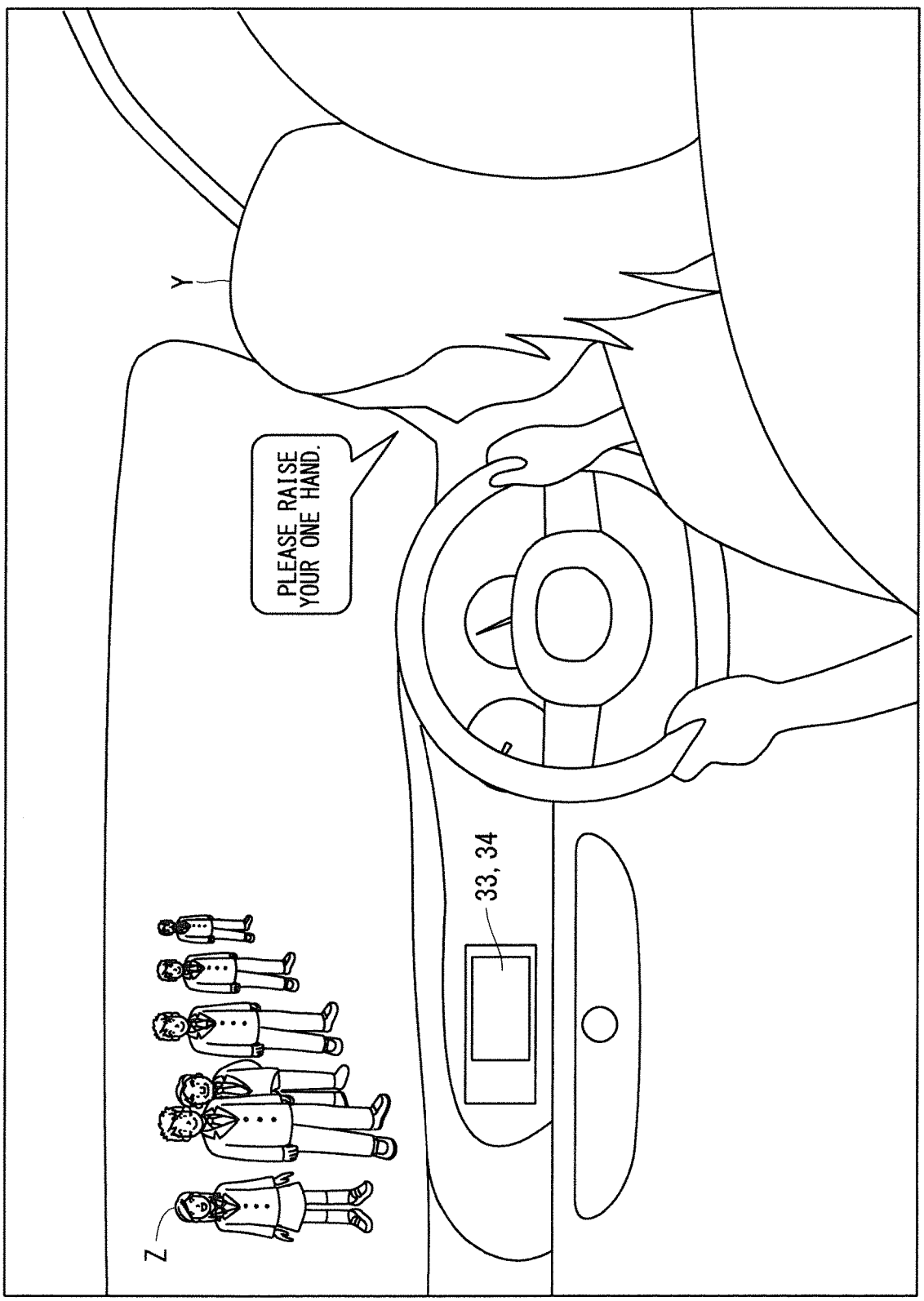
FIG. 20 shows an example of selecting a gesture by an audio command.

In FIG. 10, a case is described in which the message generator 12 selects the gesture designated by the driver on the gesture selection screen, and generates a message. Alternatively, the driver may designate a gesture by other methods. For example, the driver may designate a gesture by a voice command as illustrated in FIG. 20. In FIG. 20, when the driver says "Please raise one hand," the manipulator 35 serving as an audio input device recognizes keywords such as "one hand" and "raise" from the speech voice and sends a notification to the vehicle controller 11. The vehicle controller 11 identifies the gesture designated by the driver as a gesture G1 from the result of recognizing the speech voice by the audio input device. Then, the message generator 12 generates a message that requests the user to do the gesture G1 of "raising one hand."

Alternatively, the driver may do a gesture so that the user is able to do the same gesture as the driver. In this case, the manipulator 35 includes an on-vehicle gesture recognition unit that recognizes a person in the dispatched vehicle X. The vehicle controller 11 acquires the result of recognizing the driver's gesture via the on-vehicle gesture recognition unit and determines the gesture of the same type as the driver's gesture as a gesture type to be included in the message. Then, the message generator 12 generates a message that requests the user to do the gesture of the same type as the driver's gesture. This configuration enables the driver to more intuitively designate a gesture. In the case where the gesture requested to the user to do is determined by the driver's voice or gesture, the message generator 12 does not necessarily have to select one gesture from among predetermined gestures. For example, the message generator 12 may generate a message directly from the driver's voice saying "Please raise one hand" or a captured image of the drivers' gesture.

B-6. Variation 4

In the flowchart in FIG. 4, the driver determines the timing of generation of the message in step S206, i.e., the timing of transmission of the message, while looking at the display of the positional relationship of the vehicle, the meeting point, and the user. Alternatively, the timing of transmission may be determined by the rendezvous assistance device 102. The message needs to be transmitted with timing when the user's gesture is visible from the dispatched vehicle X. Thus, the rendezvous assistance device 102 determines the timing of transmission of the message on the basis of the positional relationship of the vehicle and the user. For example, the rendezvous assistance device 102 may determine the timing of transmission of the message on the basis of the distance between the vehicle and the user, e.g., a distance of 20 m or less between the vehicle and the user.

Moreover, the vehicle controller 11 may confirm, as a prerequisite for transmitting a message, that the user is at a visible location from the dispatched vehicle X with reference to a 3D map of the meeting point. This prevents the rendezvous assistance device 102 from transmitting a message to the mobile terminal 202A when the distance between the dispatched vehicle X and the user is short but the user is shadowed by a building or any other obstacle and invisible from the dispatched vehicle X. Also, in the case where the user is at or around the meeting point but is shadowed by a building or any other obstacle and invisible from the dispatched vehicle X, the vehicle controller 11 may specify a location of the meeting point that is visible from the dispatched vehicle X and may transmit this location to the mobile terminal 202A so as to guide the user to the location visible from the dispatched vehicle X.

As another alternative, the vehicle controller 11 may determine the timing of transmission of a message on the basis of the speed of the dispatched vehicle X. Specifically, the vehicle controller 11 may confirm, as a prerequisite for transmitting a message, that the speed of the dispatched vehicle X is less than or equal to a threshold value or typically that the dispatched vehicle X is making a stop. This prevents the driver from overlooking the user's gesture while driving the dispatched vehicle X.

B-7. Variation 5

The description thus far is based on the premise that the user who has received a message notification makes a gesture. However, in some cases, the user may be unable to do a gesture or may not want to do a gesture for some reasons such as the user has his/her hands full. In such a case, according to this variation, the mobile terminal 202A provides information with which the user is identified (hereinafter, referred to as "identification information"), instead of with a gesture, to the rendezvous assistance device 102, so that the driver is able to identify the user from among numerous persons even if the user is not doing a gesture.

Figure 21:
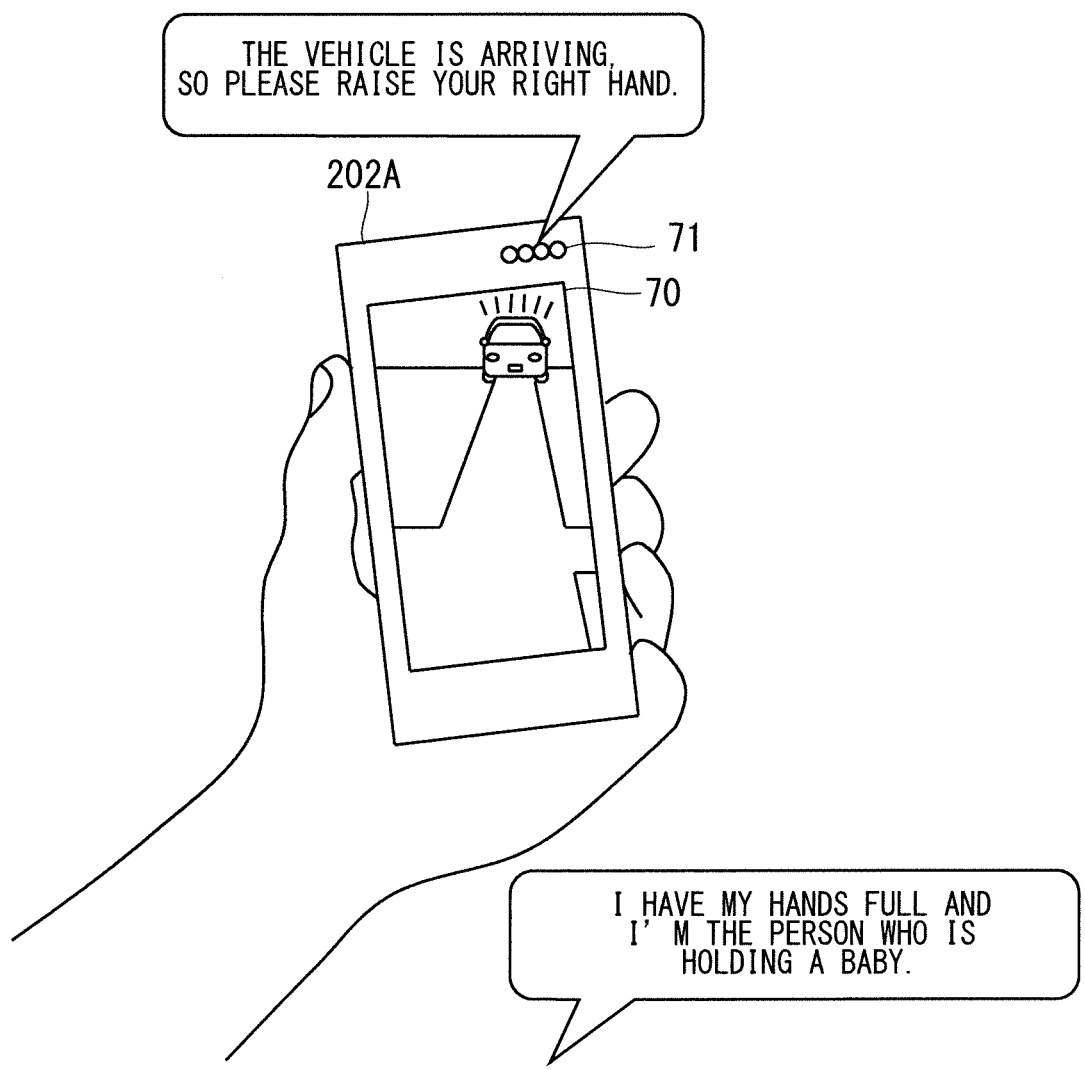
FIG. 21 illustrates a condition in which a user inputs identification information to the mobile terminal, instead of refusing to do a gesture.
Figure 22:
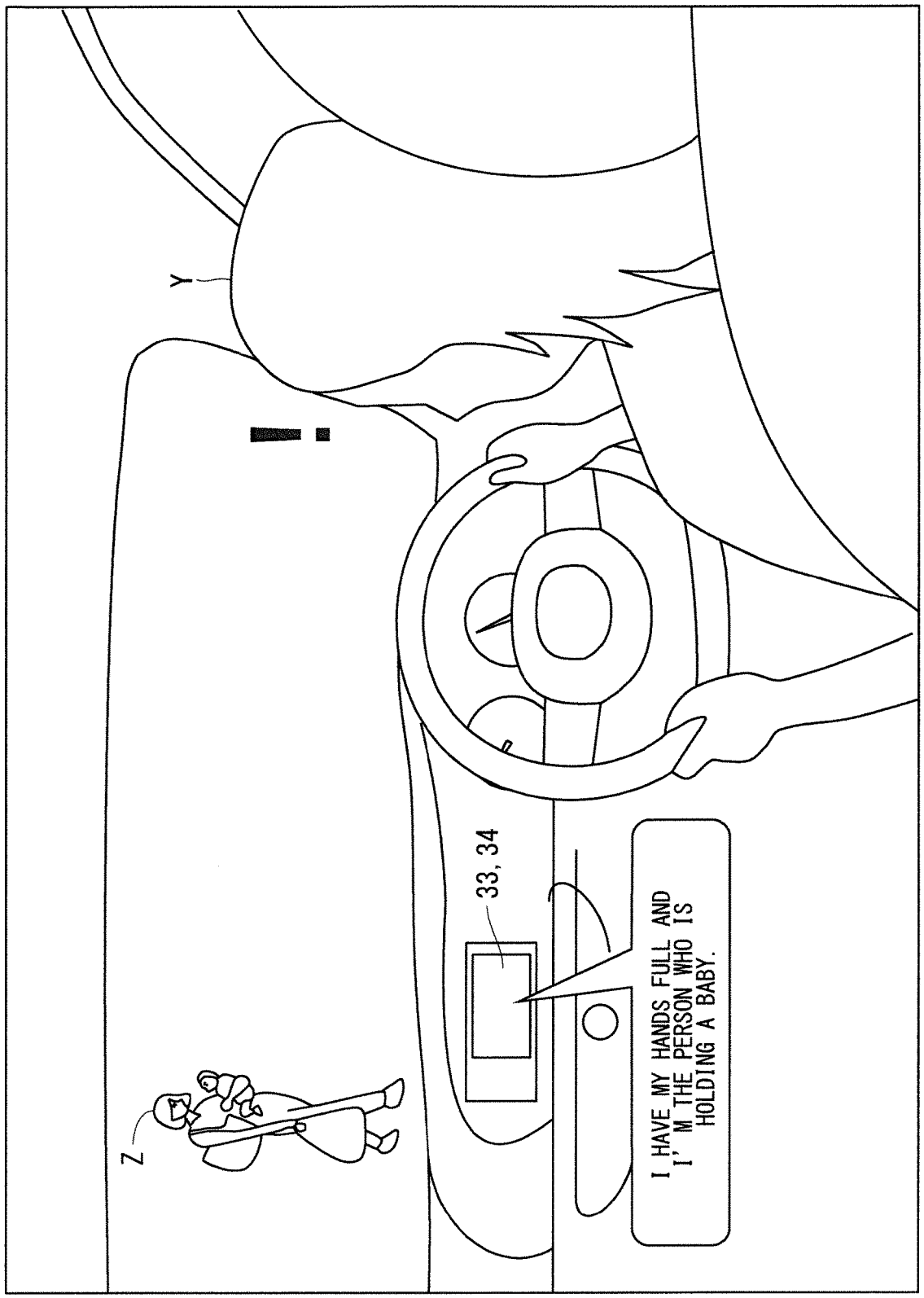
FIG. 22 illustrates a condition in which the driver identifies the user from the identification information.

FIG. 21 illustrates a condition in which the mobile terminal 202A that has received a message from the rendezvous assistance device 102 sends a message notification to the user. The speaker 71 of the mobile terminal 202A outputs a voice saying "The vehicle is arriving, so please raise your right hand." At this time, it is assumed that the user has his/her hands full and is thus unable to raise his/her right hand. The user may say "I have my hands full and I'm the person who is holding a baby." Here, the "person who is holding a baby" serves as the identification information. The mobile terminal 202A is provided with a microphone and acquires and transmits the user's speech voice to the rendezvous assistance device 102 via the mobile communicator 22. In the rendezvous assistance device 102, the vehicle controller 11 causes the audio output device 34 to output the user's speech voice, which includes the identification information acquired from the mobile terminal 202A by the vehicle communicator 14, either directly as illustrated in FIG. 22 or after being translated simply to, for example, "the person who is holding a baby." This enables the driver Y to identify the user Z who is holding a baby.

B-8. Variation 6

Figure 23:
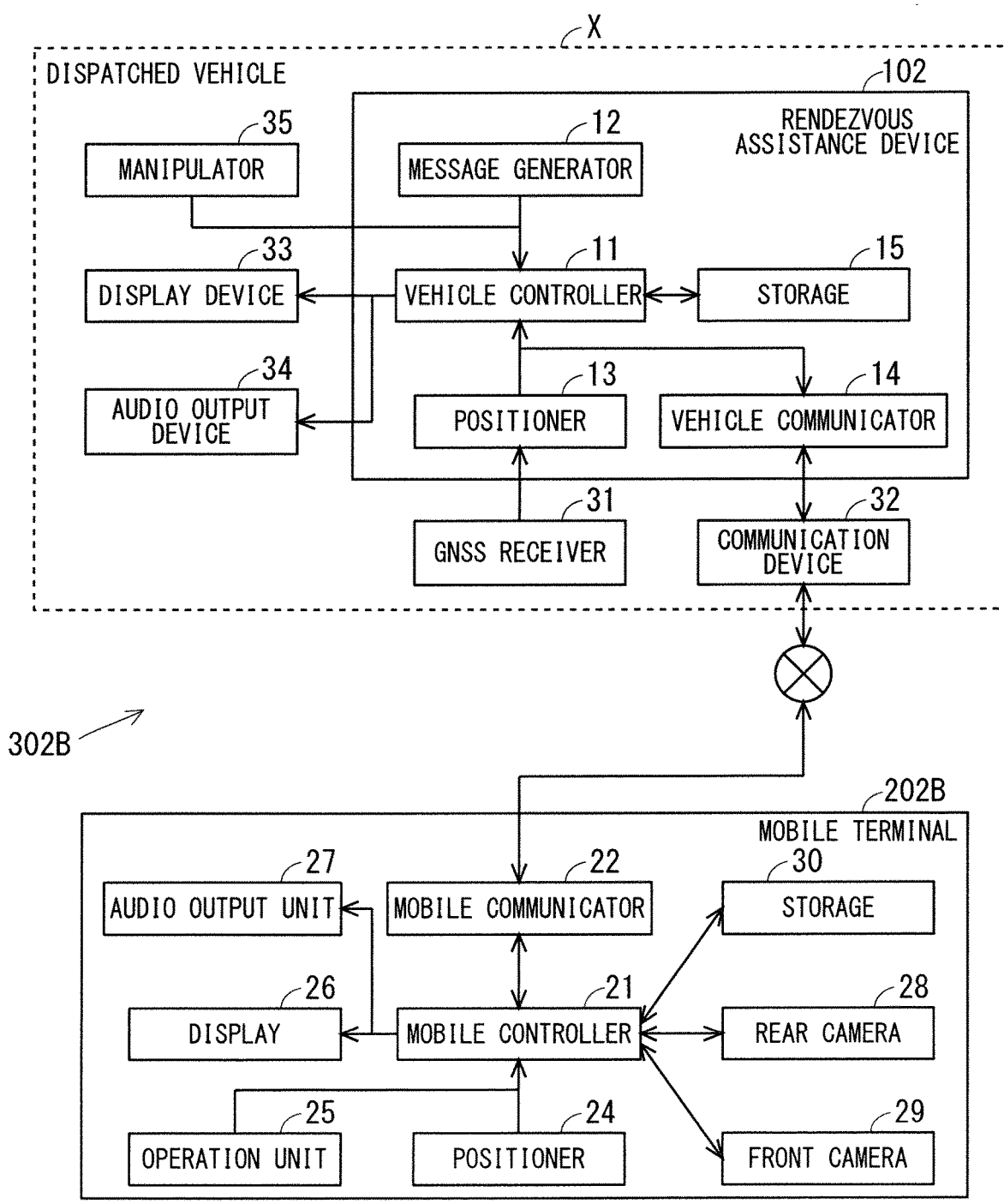
FIG. 23 is a block diagram illustrating a configuration of a rendezvous assistance system according to Variation 6 of Embodiment 2.

If the user makes a gesture while facing in the direction of approach of the dispatched vehicle X, the user's gesture is more likely to be visible from the driver. In view of this, according to this variation, a notification that indicates the direction of approach of the dispatched vehicle X is sent to a user who has arrived at the meeting point, so the user is guided to face in the direction of approach. FIG. 23 is a block diagram illustrating a configuration of a rendezvous assistance system 302B according to a variation for guiding a user. The rendezvous assistance system 302B includes the rendezvous assistance device 102 and a mobile terminal 202B. The mobile terminal 202B includes, in addition to the configuration of the mobile terminal 202A according to Embodiment 2 in FIG. 3, a rear camera 28 and a front camera 29. The rear camera 28 is a camera that captures an image on the side opposite to the display side of the mobile terminal 202B. The front camera 29 is a camera that captures an image on the display side of the mobile terminal 202B. When a user is looking at the display of the mobile terminal 202B, the rear camera 28 is capable of capturing an image on the side opposite to the user, and the front camera 29 is capable of capturing an image of the user.

Figure 24:
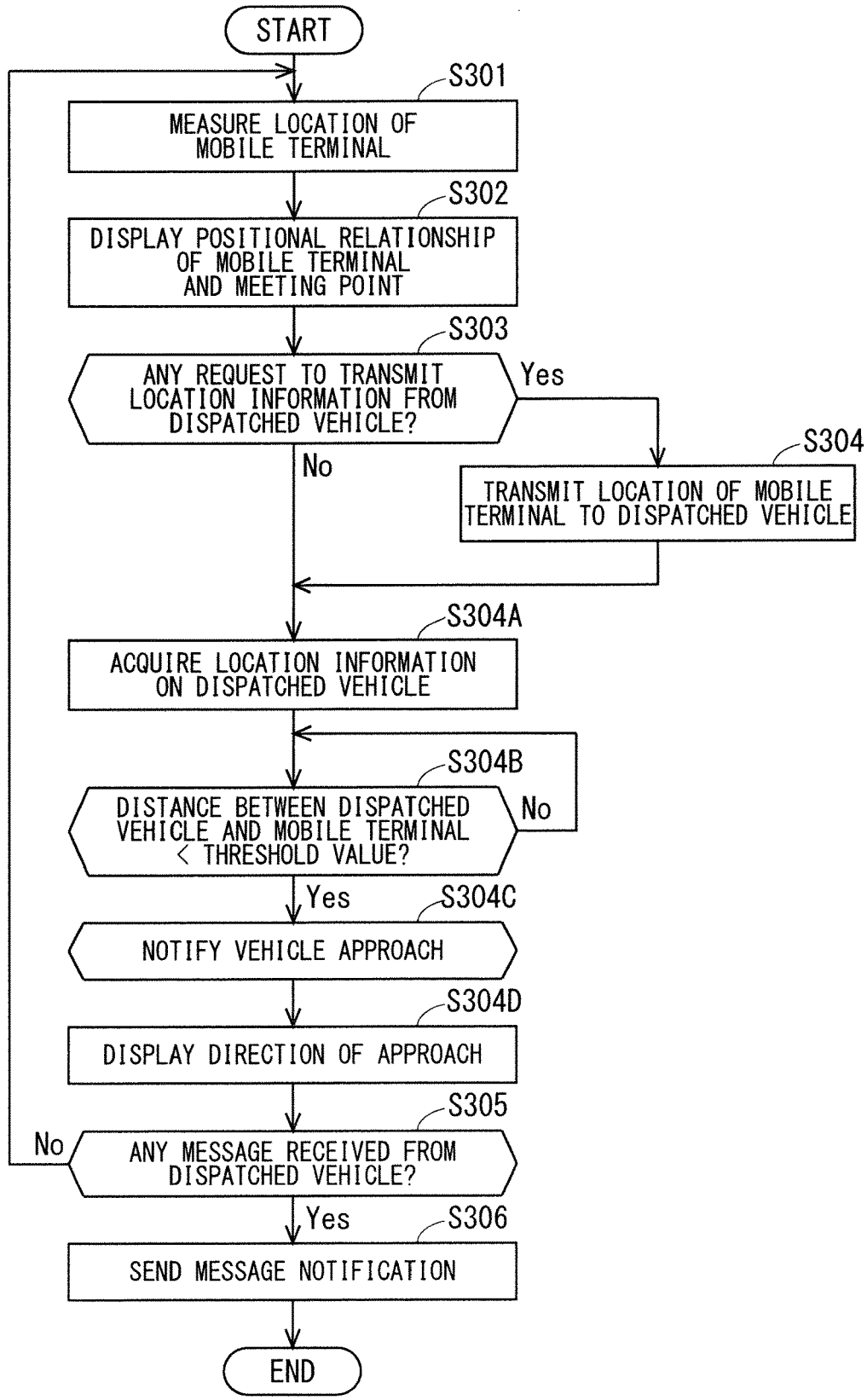
FIG. 24 is a flowchart illustrating operations of a mobile terminal according to Variation 6 of Embodiment 2.

FIG. 24 is a flowchart illustrating operations of the mobile terminal 202B in the rendezvous assistance system 302B. Hereinafter, the operations of the mobile terminal 202B will be described with reference to the flowchart in FIG. 24. Steps S301 to S304 are similar to those in the operations of the mobile terminal 202A illustrated in FIG. 11. After step S304 or when it is determined in step S303 that there is no request to transmit location information from the dispatched vehicle X, the mobile communicator 22 of the mobile terminal 202B acquires the location information on the dispatched vehicle X from the rendezvous assistance device 103 (step S304A). Then, the mobile controller 21 acquires the location information on the mobile terminal 202B from the positioner 24 and determines whether the distance between the mobile terminal 202B and the dispatched vehicle X is less than a predetermined threshold value (step S304B).

Figure 25:
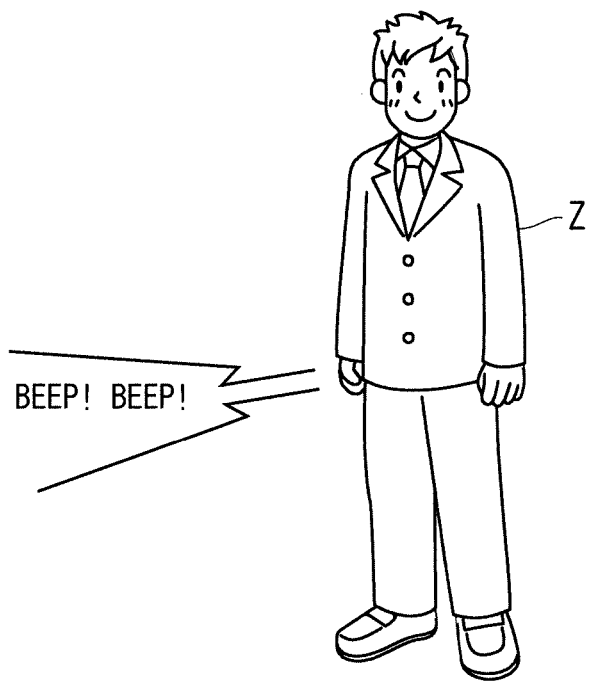
FIG. 25 illustrates a vehicle approach notification received by the mobile terminal.

In step S304B, the mobile controller 21 waits until the distance between the mobile terminal 202B and the dispatched vehicle X becomes less than the threshold value. When the distance between the mobile terminal 202B and the dispatched vehicle X is less than the threshold value, the mobile terminal 202B issues a vehicle approach notification (step S304C). FIG. 25 illustrates a condition in which the audio output unit 27 issues a vehicle approach notification by producing a beeping sound. Alternatively, in addition to or instead of producing a sound, the mobile terminal 202B may issue a vehicle approach notification by transmitting vibrations. This enables the user to notice the approach of the dispatched vehicle X even if, for example the user has the mobile terminal 202B in his/her pocket, and to pick up the mobile terminal 20213 and prepare for rendezvous with the dispatched vehicle X. Preparing for rendezvous means starting an application for assisting rendezvous in the mobile terminal 202B.

Figure 26:
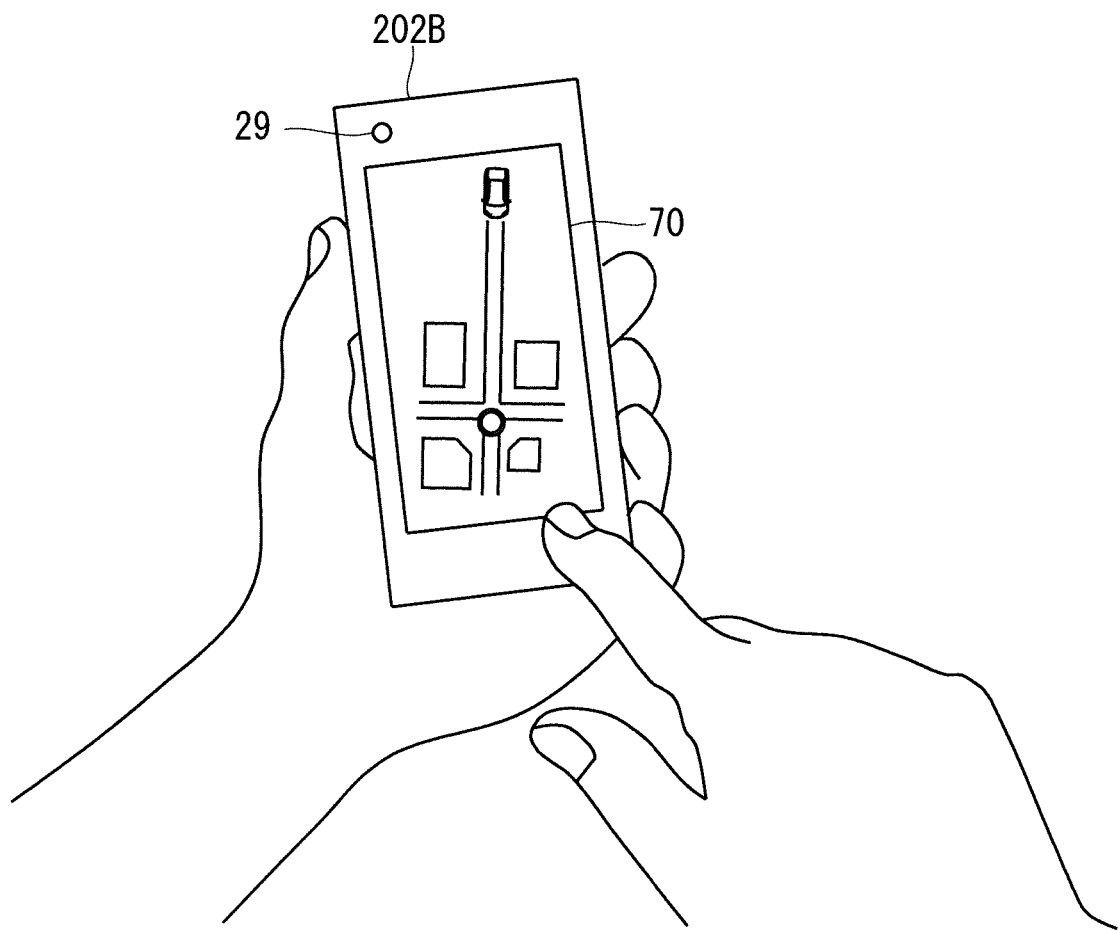
FIG. 26 illustrates a condition in which the mobile terminal displays the direction of approach of a vehicle on a map.

Next, the mobile controller 21 estimates a route of the dispatched vehicle X to the meeting point on the basis of the location information on the dispatched vehicle X and the location information on the meeting point, and estimates the direction of approach of the dispatched vehicle X to the meeting point. Then, the mobile controller 21 displays the estimated direction of approach of the dispatched vehicle X on the display 26 (step S304D). FIG. 26 illustrates a condition in which the direction of approach of the dispatched vehicle X is displayed on a display 70 of the mobile terminal 202B. When the user has started an application for assisting rendezvous upon receipt of the above-described vehicle approach notification, the map of the meeting point is displayed on the display 70. Here, the map is displayed such that the bearing on the map on the display 70 matches the bearing on the mobile terminal 202B. Therefore, an arrow that indicates the direction of approach of the dispatched vehicle X displayed on the display 70 matches the actual direction of approach of the dispatched vehicle X, and the user is able to grasp the direction of approach of the vehicle by looking at the direction of approach of the dispatched vehicle X displayed on the display 70. Although the direction of approach is notified by the display in FIG. 26, the direction of approach may be notified by audio.

Figure 27:
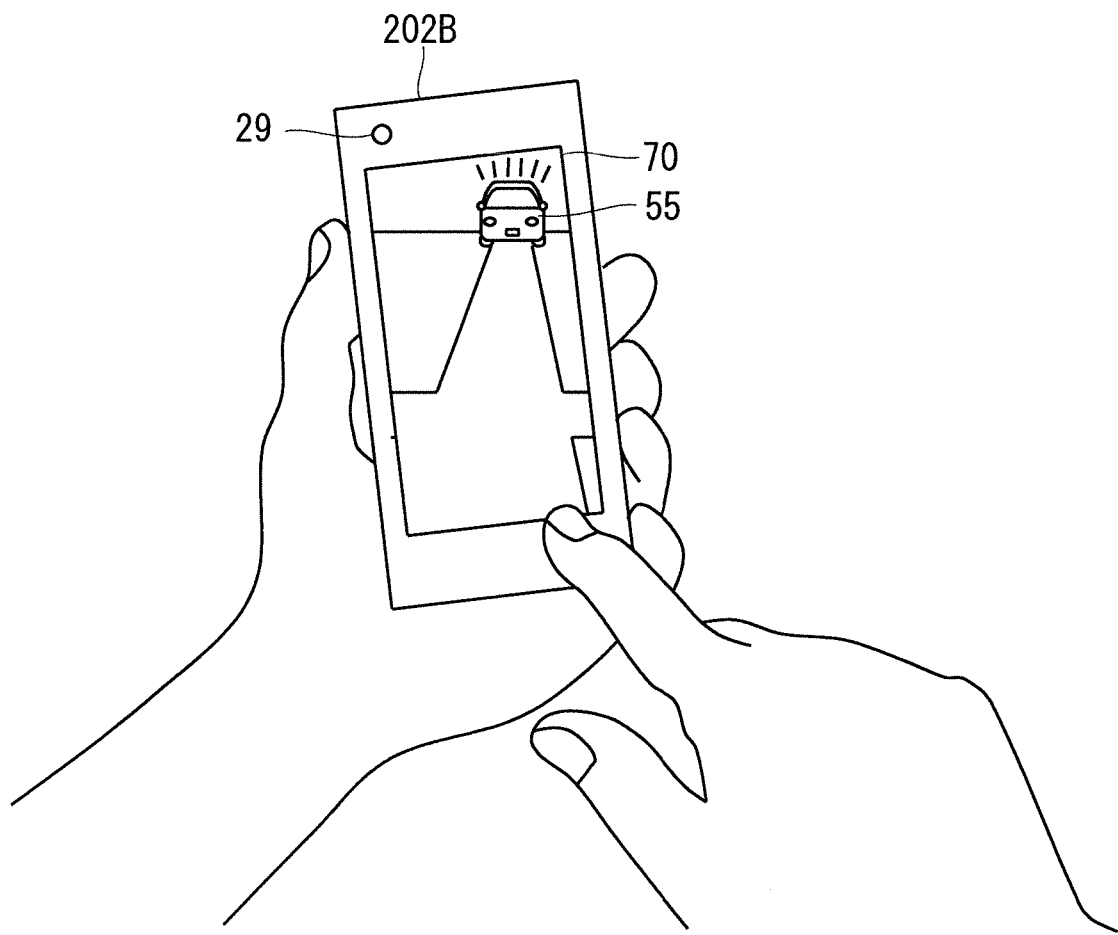
FIG. 27 illustrates a condition in which an icon indicating the direction of approach of a vehicle is superimposed and displayed on an image captured by a camera of the mobile terminal.

As illustrated in FIG. 27, when the user has started the rear camera 28 of the mobile terminal 202B and captured an image in the direction of approach of the vehicle with the rear camera 28, the mobile controller 21 may superimpose and display an icon 55 that indicates a virtual dispatched vehicle X at a position on the display 26, the position corresponding to the direction of approach of the vehicle in the image captured by the rear camera 28. This enables the user to more intuitively grasp the direction of approach of the vehicle.

Note that when the screen as illustrated in FIG. 26 is shown on the display 26, the mobile terminal 203 may determine whether the user is looking in the direction of approach of the dispatched vehicle X. Specifically, the front camera 29 captures an image of the user's face. The mobile controller 21 compares the orientation of the user's face or the direction of the user's line of vision in the image captured by the front camera 29 with the direction of approach of the dispatched vehicle X displayed on the display 70 and determines whether the user is looking in the direction of approach of the dispatched vehicle X. Then, if the user is not looking in the direction of approach of the dispatched vehicle X, the display 26 or the audio output unit 27 may issue a notification that prompts the user to look in the direction of approach of the dispatched vehicle X.

In the example described above, the mobile controller 21 determines whether the user is looking in the direction of approach of the dispatched vehicle X from the orientation of the user's face or the direction of the user's line of vision. Alternatively, the mobile terminal 202B may display a confirmation icon on the screen that displays the direction of approach of the dispatched vehicle X, and the mobile controller 21 may determine, in response to a user operation of pressing that icon, that the user is looking in the direction of approach of the dispatched vehicle X.

Figure 28:
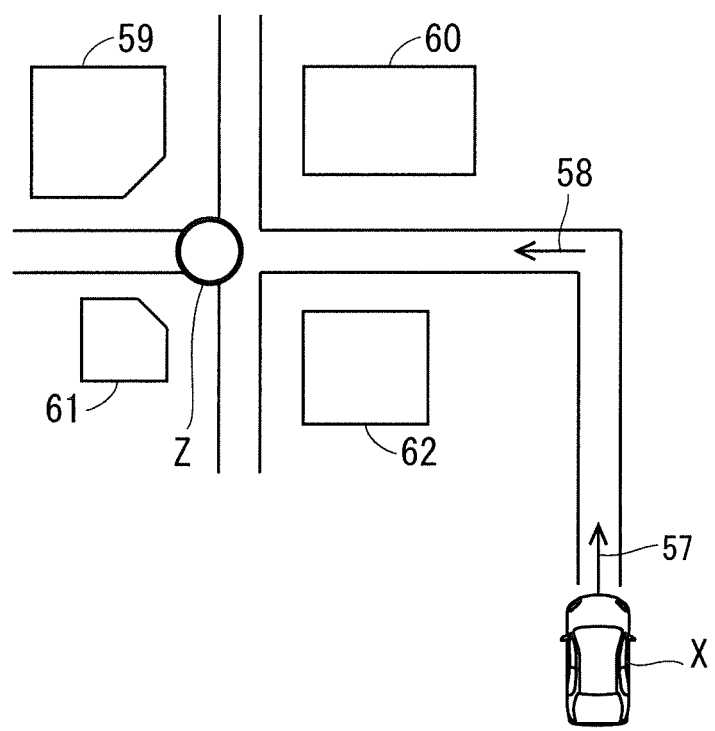
FIG. 28 illustrates a relationship between the direction of travel of a vehicle and the direction of approach of the vehicle.

FIG. 28 illustrates a relationship of the direction of travel of the dispatched vehicle X and the direction of approach thereof. In the case where the dispatched vehicle X makes a turn at a corner or any other point before arriving at the meeting point, a current travel direction 57 of the dispatched vehicle X does not match an approach direction 58 of the dispatched vehicle X travelling toward the meeting point. In this case, the approach direction 58 in FIG. 28 corresponds to the direction of approach of the dispatched vehicle X described with reference to FIGS. 26 and 27.

Figure 29:
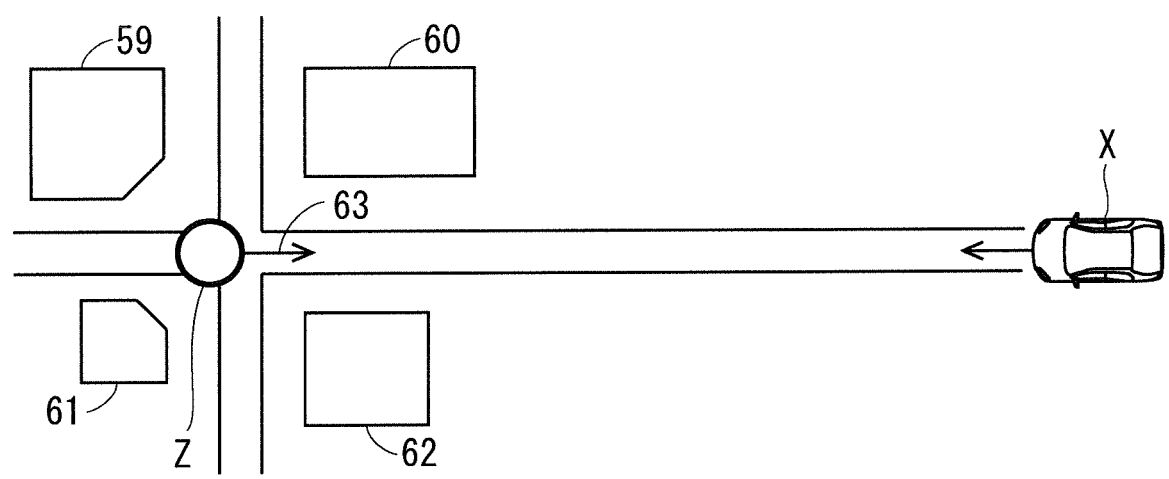
FIG. 29 illustrates an effect of guiding the user's line of vision to the direction of approach of the vehicle.

Guiding the user's line of vision in the direction of approach of the dispatched vehicle X is effective when the meeting point is at, for example, an intersection between buildings where it is difficult to receive GNSS signals. FIG. 29 illustrates the case in which the meeting point is at the intersection surrounded by buildings 59 to 62. At such a meeting point, it is difficult for the user Z who is standing even at the meeting point to know in which direction the user is facing and from which direction the dispatched vehicle X is coming.

Figure 30:
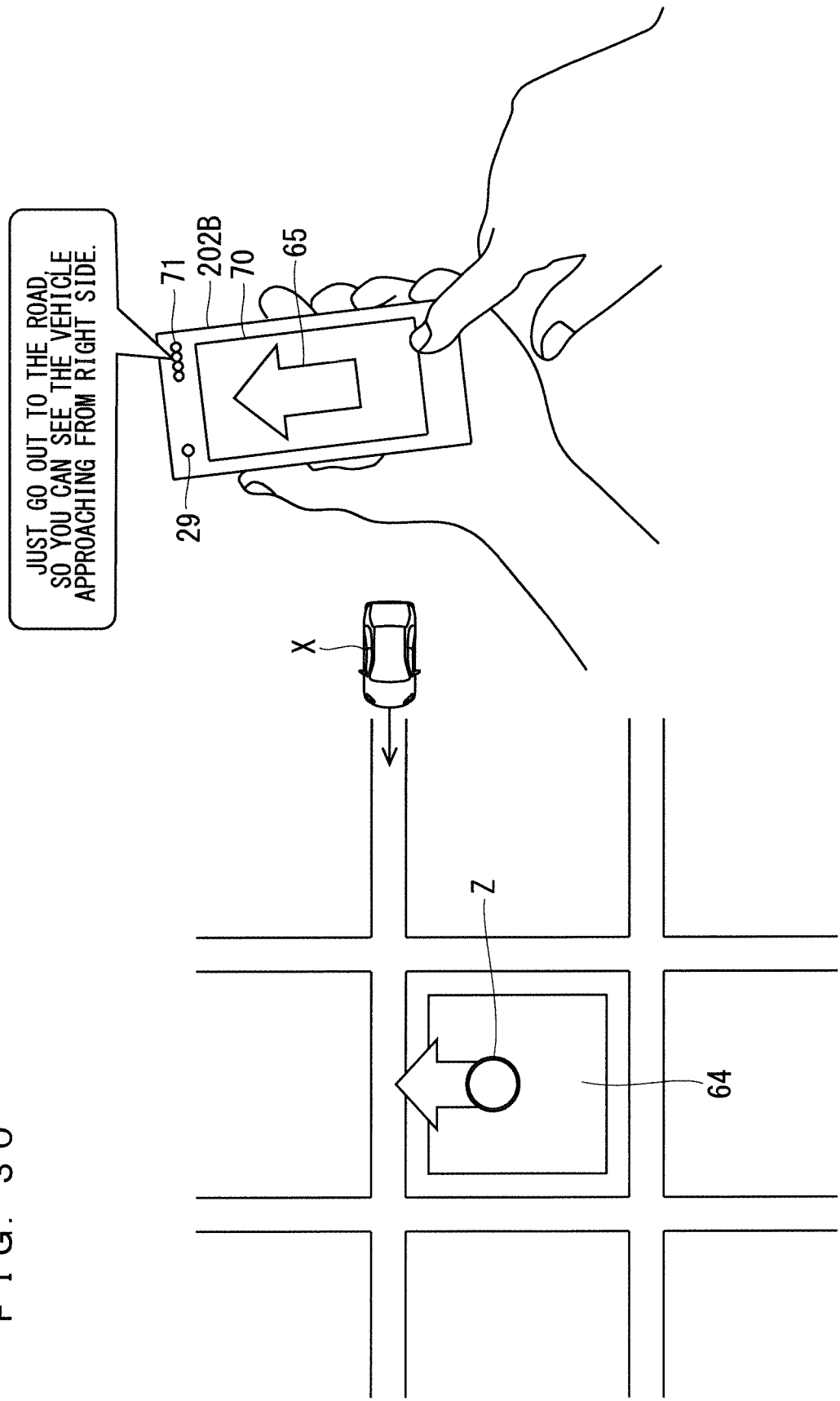
FIG. 30 is a conceptual diagram illustrating how the user is guided to the meeting point outside a building.

In the above description, the user's line of vision who is at the meeting point is guided in the direction of approach of the dispatched vehicle X. In addition to this, the mobile terminal 202B may perform processing for guiding the user to the meeting point. In the case in which a user Z is inside a building 64 and the meeting point is on the road in front of the building 64 as illustrated in FIG. 30, it may be difficult for the user Z to know from which exit the user should go out. In this case, the user Z may start an application of the mobile terminal 202B and captures an image with the rear camera 28. The mobile controller 21 may estimate an appropriate route to the exit inside the building 64 from the image captured by the rear camera 28 and guide the user to the exist by superimposing and displaying an arrow 65 that indicates the route to the exit on the image that is captured by the rear camera 28 and displayed on the display 26.

B-9. Variation 7

The flowchart in FIG. 15 does not refer to processing of the rendezvous assistance device 102 that is performed after the driver has visually recognized the user's gesture. When the driver has visually recognized the user's gesture, the rendezvous assistance device 102 may notify the mobile terminal 202A of this recognition. For example, the vehicle controller 11 may display an icon that is to be operated by the driver after having visually recognized the user's gesture, on the positional-relationship display screen illustrated in FIG. 8 and, when the icon is operated, may determine that the driver has visually recognized the user's gesture. Alternatively, when the manipulator 35 serving as an audio recognition unit has recognized the driver's speech voice saying, for example, "The gesture is visually recognized," the vehicle controller 11 may determine that the driver has visually recognized the user's gesture. As another alternative, when the manipulator 35, which serves as a gesture recognition unit for recognizing the driver's gesture, has recognized a predetermined driver's gesture, the vehicle controller 11 may determine that the driver has visually recognized the user's gesture. When the mobile terminal 202A has issued a notification indicating the driver's recognition of the user's gesture, to the user by a display or audio, the user is able to stop doing the gesture and does not need to unnecessarily continue the gesture for a long time.

B-10. Variation 8

In FIGS. 21 and 22, a case is described in which the user does not make a gesture. On the contrary, when the user makes a gesture, the mobile terminal 202A may issue a notification indicating the user's gesture to the rendezvous assistance device 102. For example, the mobile controller 21 of the mobile terminal 202A displays a text stating "Will you make a gesture?" and Yes and No buttons on the message notification screen displayed on the display 26. When the user selects "Yes," the mobile communicator 22 issues a notification indicating that the user is making a gesture or is to make a gesture, to the rendezvous assistance device 102. When the user selects "No," the mobile controller 21 causes the display 26 or the audio output unit 27 to display a message or output a voice that requests the user to input identification information, instead of doing a gesture. In this way, when the operation unit 25 has acquired operation information on the user's intention to do a gesture, the mobile communicator 22 transmits information indicating the user's intension to do a gesture to the vehicle communicator 14 of the rendezvous assistance device 102. Then, the vehicle controller 11 notifies the driver of the dispatched vehicle of the user's intension to do a gesture, via the display device 33 or the audio output device 34. This configuration enables the driver to confirm the user's intention to do a gesture.

B-11. Variation 9

A case is assumed in which there are a plurality of dispatched vehicles X each provided with the rendezvous assistance device 102 according to the present embodiment, and each dispatched vehicle X is trying to rendezvous with its user at the same or close meeting points. The "close meeting points" as used herein mean that the gestures of the persons at the respective meeting points are visible from one another. In this case, if a plurality of dispatched vehicles X require their user to do the same gesture, each dispatched vehicle X may mistakenly recognize a different person who is making the gesture as its user. This may inhibit smooth rendezvous. Accordingly, it is desirable to make adjustments such that the dispatched vehicles X avoid requiring their user to do the same gesture.

In view of this, the rendezvous assistance device 102 mounted on each dispatched vehicle X shares the types of gestures that the other rendezvous assistance devices 102 require their user to do. For example, it is assumed that vehicles A, B, and C are at the same meeting point. First, when the vehicle communicator 14 in the rendezvous assistance device 102 of the vehicle A has transmitted a gesture G1 to the mobile terminal 202A of its user, this gesture G1 is also transmitted as a used gesture to the rendezvous assistance devices 102 of the other vehicles B and C. In this way, the vehicles A to C share the information that the gesture G1 has already been used. The vehicles B and C that issue a request for a gesture thereafter will request their user to do different gestures other than the gesture G1. At this time, for example, the gesture G1 may be displayed in gray in order not to be selected on the gesture selection screen displayed on the display devices 33 of the rendezvous assistance devices 102 of the vehicles B and C. Next, when the vehicle communicator 14 in the rendezvous assistance device 102 of the vehicle B has transmitted a gesture G2 to the mobile terminal 202A of its user, similarly this gesture G2 is also transmitted as a used gesture to the rendezvous assistance devices 102 of the other vehicles A and C. In the same manner as described above, the vehicle C becomes incapable of selecting the gestures G1 and G2. The history of the used gestures accumulated in this manner will be reset after a lapse of a given period of time, e.g., 15 minutes.

B-12. Variation 10

Instead of adjusting gestures as described in <B-11>, the rendezvous assistance device 102 may again transmit a message that requests a user to do a gesture of a different type to the mobile terminal 202A if numerous persons are doing the requested gesture at the meeting point. At this time, the driver may be allowed to select a newly required gesture on the gesture selection screen.

B-13. Variation 11

The above description given with reference to FIG. 12, for example, is based on the premise that the driver rides on the dispatched vehicle X. However, the driver may be a remote control operator who operates the dispatched vehicle X by remote control. In this case, the various input and output interfaces of the rendezvous assistance device 102 described above are provided not in the dispatched vehicle X but in the place where the remote control operator is present.

C. Embodiment 3

C-1. Configuration

Figure 31:
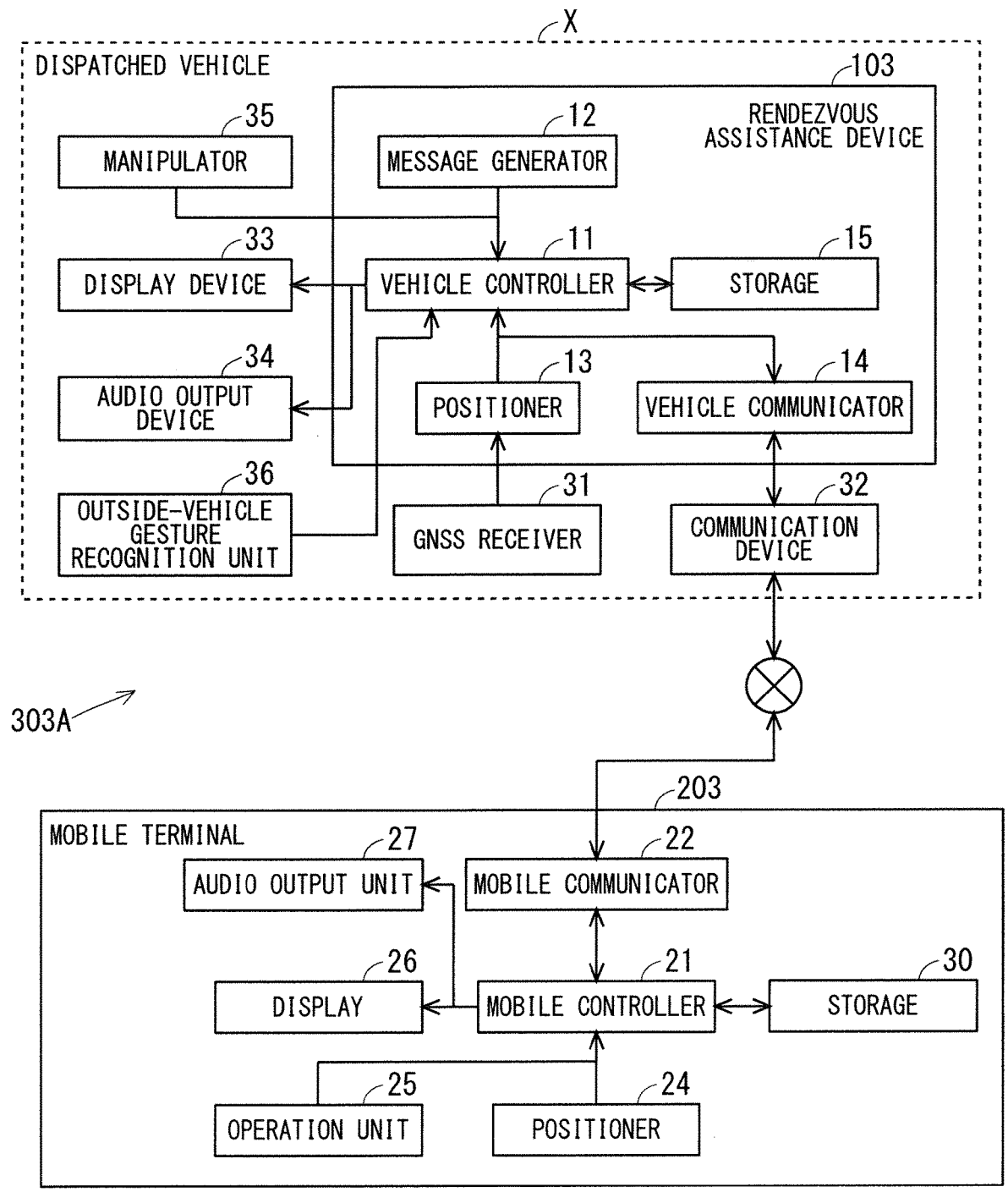
FIG. 31 is a block diagram illustrating a configuration of a rendezvous assistance system according to Embodiment 3.

FIG. 31 is a block diagram illustrating a configuration of a rendezvous assistance system 303 according to Embodiment 3. The rendezvous assistance system 303 includes a rendezvous assistance device 103 and a mobile terminal 203. The rendezvous assistance device 103 is different from the rendezvous assistance device 102 according to Embodiment 2 in that it is connected to an outside-vehicle gesture recognition unit 36 and configured to be capable of using the outside-vehicle gesture recognition unit 36. The outside-vehicle gesture recognition unit 36 is a device that is mounted on a dispatched vehicle X and recognizes a gesture of a person outside the dispatched vehicle X. For example, the outside-vehicle gesture recognition unit 36 may include a camera that captures an image around the dispatched vehicle X, and a processor that analyzes the image captured by the camera to recognize a gesture. On the basis of the result of gesture recognition by the outside-vehicle gesture recognition unit 36, the vehicle controller 11 identifies, as its user, a person who is making a gesture required by the rendezvous assistance device 103 outside the dispatched vehicle X, and notifies the driver of the identified user via the display device 33 or the audio output device 34.

C-2. Operations

Figure 32:
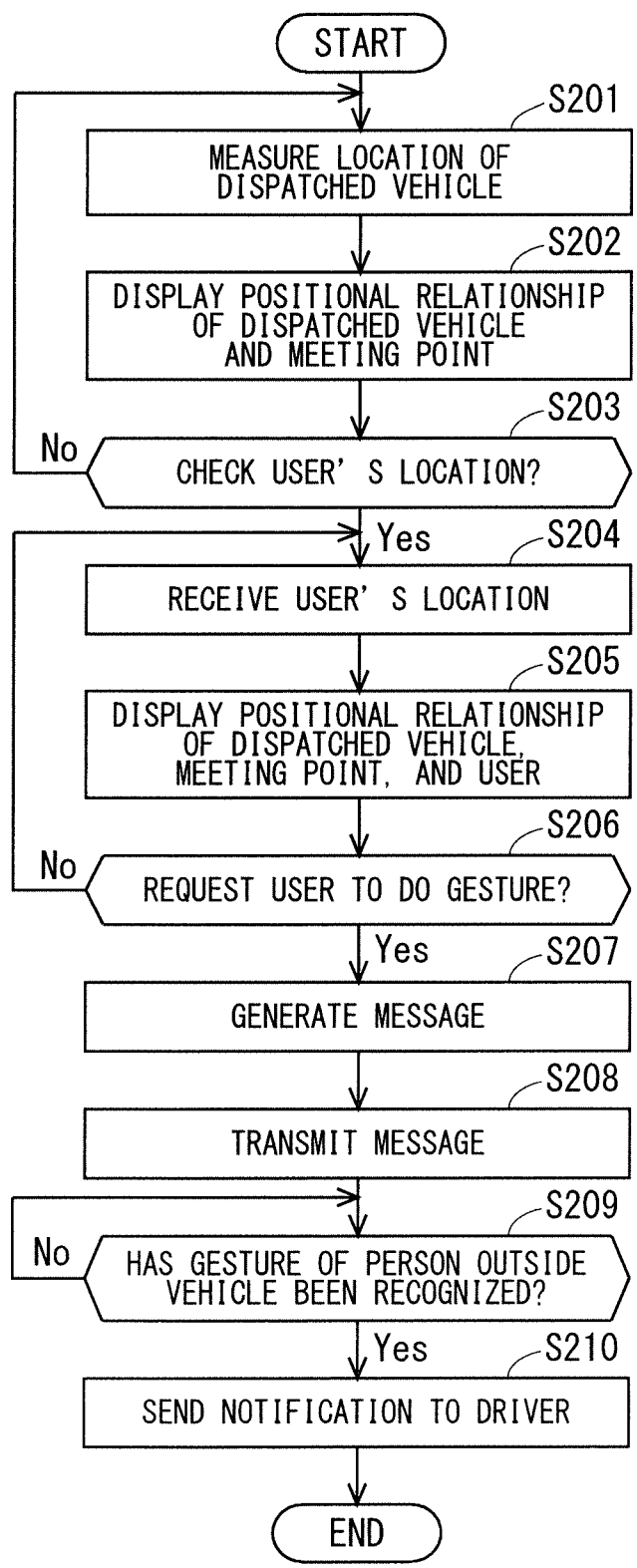
FIG. 32 is a flowchart illustrating operations of the rendezvous assistance device according to Embodiment 3.

FIG. 32 is a flowchart illustrating operations of the rendezvous assistance device 103. Hereinafter, the operations of the rendezvous assistance device 103 will be described with reference to the flowchart in FIG. 32. Steps S201 to S208 are similar to those in the flowchart of processing of the rendezvous assistance device 102 illustrated in FIG. 4. After the vehicle communicator 14 has transmitted a message to the mobile terminal 203 in step S208, the vehicle controller 11 determines whether a person outside the vehicle has made the gesture required to do by the rendezvous assistance device 103 (hereinafter, referred to as the "requested gesture") (step S209). When a person outside the vehicle has made the requested gesture, the outside-vehicle gesture recognition unit 36 detects this gesture and sends a notification to the vehicle controller 11. The vehicle controller 11 makes this determination in step S209 in accordance with the notification received from the outside-vehicle gesture recognition unit 36. The vehicle controller 11 repeats step S209 until a person outside the vehicle makes the requested gesture. When having determined in step S209 that a person outside the vehicle has made the requested gesture, the vehicle controller 11 identifies the person who has made the gesture as its user and sends a notification indicating the result of user identification to the driver via the display device 33 or the audio output device 34 (step S210). Through the processing described above, the operations of the rendezvous assistance device 103 end.

Figure 34:
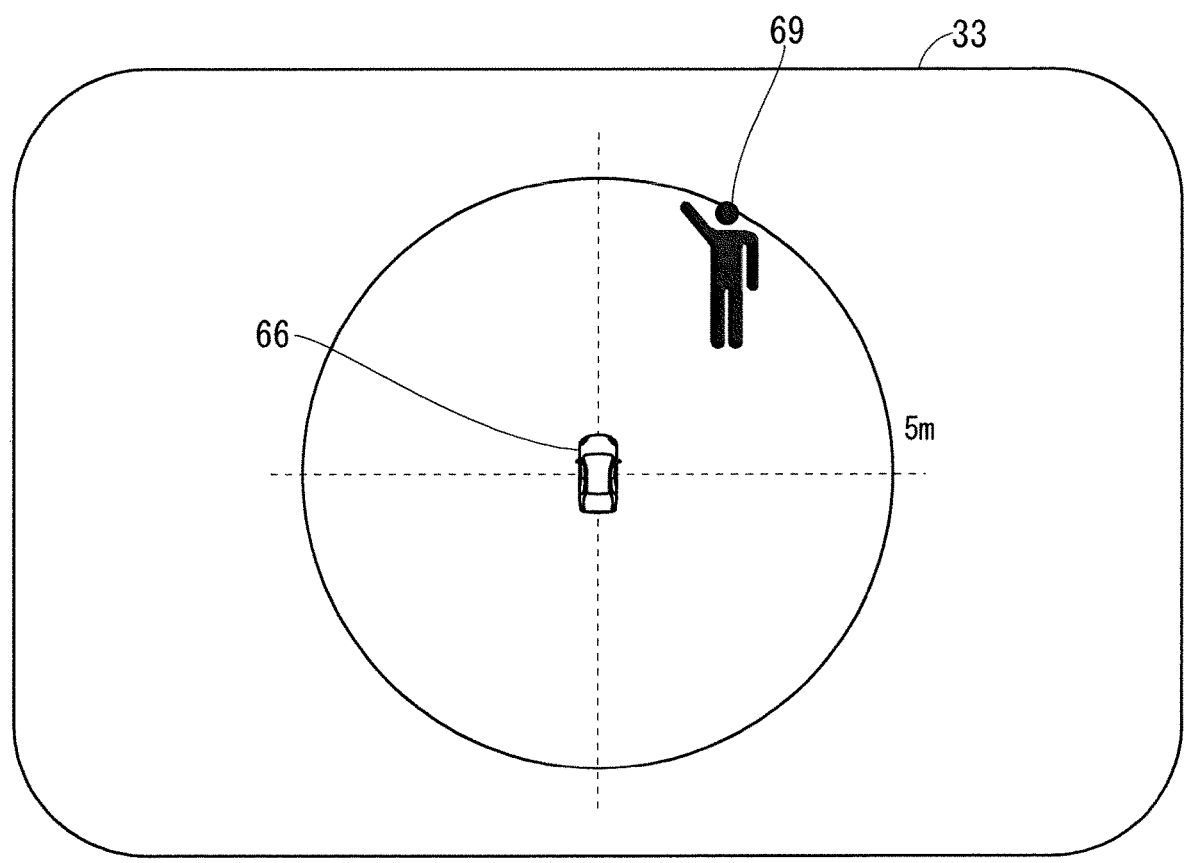
FIG. 34 shows an example of displaying the result of identifying the user by gesture recognition.
Figure 35:
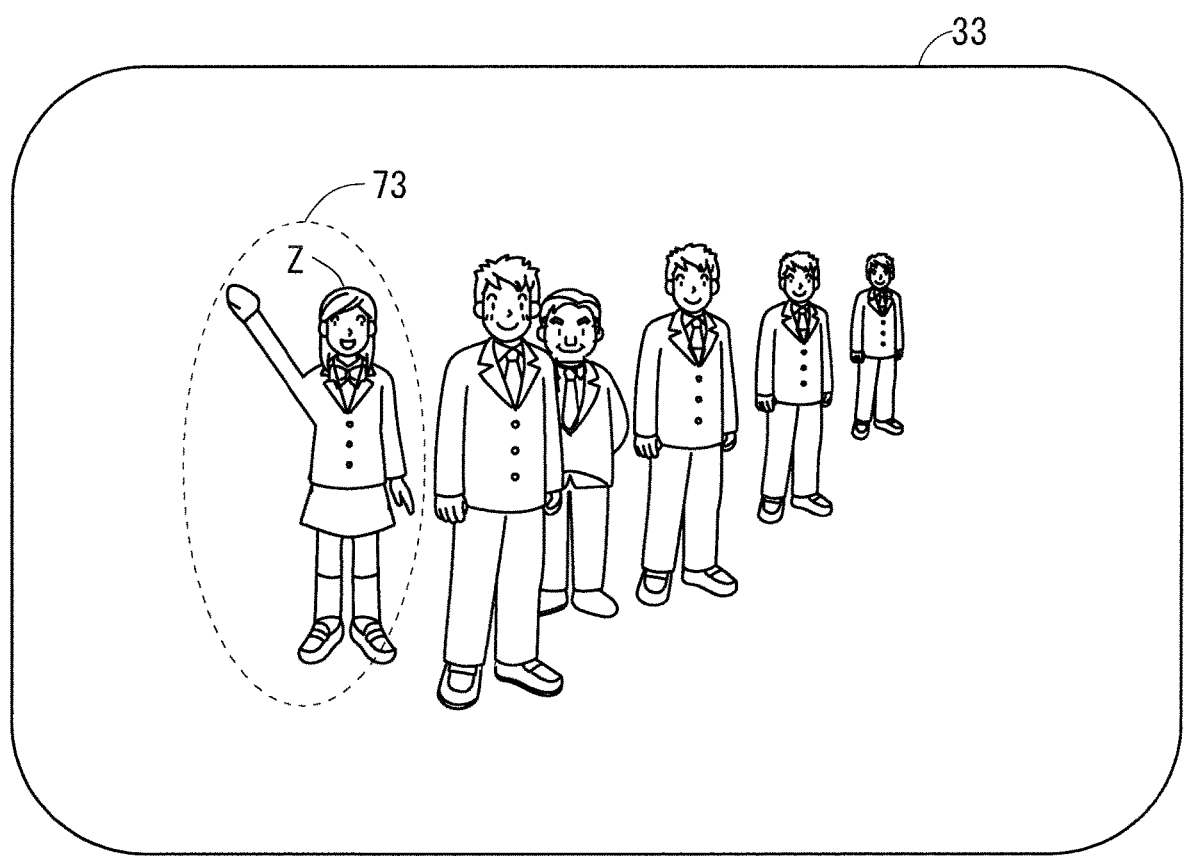
FIG. 35 shows an example of displaying the result of identifying the user by gesture recognition.

FIGS. 33 to 35 show examples of display when the display device 33 provides a notification to the driver in step S210. In FIG. 33, objects 66, 67, and 68 are displayed, the object 66 representing the location of the dispatched vehicle X, the object 67 representing the location of the user, and the object 68 representing the direction of the user as viewed from the dispatched vehicle X. At first glance, the display in FIG. 33 is similar to the display in FIG. 8 described in Embodiment 2. However, the location of the user displayed in FIG. 33 is the location identified by gesture recognition, whereas the location of the user displayed in FIG. 8 is the location measured based on the GLASS signal and other information. Thus, the object 67 displays the location of the user with higher precision. This enables the driver to accurately grasp the location of the user.

Although the location of the user is represented by the object 67 that imitates the mobile terminal in FIG. 33, the location of the user may be represented by an object 69 that imitates the gesture made by the user.

Moreover, the vehicle controller 11 may superimpose and display a frame 73 that differentiates the user on the image of the meeting point on the display device 33 as illustrated in FIG. 35. The image of the meeting point as used herein may be an image captured by the outside-vehicle gesture recognition unit 36, or may be an image captured by an outside-vehicle image capturing device such as an electron mirror of the dispatched vehicle X. The vehicle controller 11 may also display a virtual image object that surrounds the user in the actual view on the display device 33, which serves as a translucent display such as an HUD. The vehicle controller 11 may also detect the direction of the line of vision of the driver and execute display for guiding the line of vision of the driver to the user.

As another alternative, the vehicle controller 11 may pause the image of the user who is making a gesture for a given period of time and display this image on the display device 33, or may display the user in enlarged dimensions on the display device 33.

In the above description, the result of gesture recognition is notified of the driver via a display on the display device 33. Besides this, the result of gesture recognition may be notified of the driver by audio by the audio output device 34. For example, the vehicle controller 11 may use the location information on the user identified by gesture recognition and cause the audio output device 34 to output the direction of the user as viewed from the dispatched vehicle X by, for example, making an announcement saying "Please look in the direction of 10 degrees on the right side."

With this configuration, the driver is notified of the location of the user identified by gesture recognition via a display or audio. This eliminates the need for the driver to look around in order to visually recognize a person who is making a gesture.

Alternatively, the vehicle controller 11 may cause the audio output device 34 to output an announcement about information other than the direction of the user, such as clothes and appearance of the user identified based on the result of gesture recognition. As another alternative, the vehicle controller 11 may notify the driver of only the fact that the gesture is recognized, via the display device 33 or the audio output device 34. In this case, the driver is able to look for the user in full confidence that the user is making a gesture.

C-3. Variation of Notifying Driver of Information that User is Recognized by Driver In the same manner as in Variation [B-9] of Embodiment 2, after step S210 in FIG. 32, the rendezvous assistance device 103 may notify the mobile terminal 203 of the fact that the user is recognized b the driver. The fact that the "user is recognized" as used herein includes a case in which the driver recognizes the user on the display screen of the display device 33 as illustrated in FIG. 35.

D. Embodiment 4

D-1. Configuration

Figure 36:
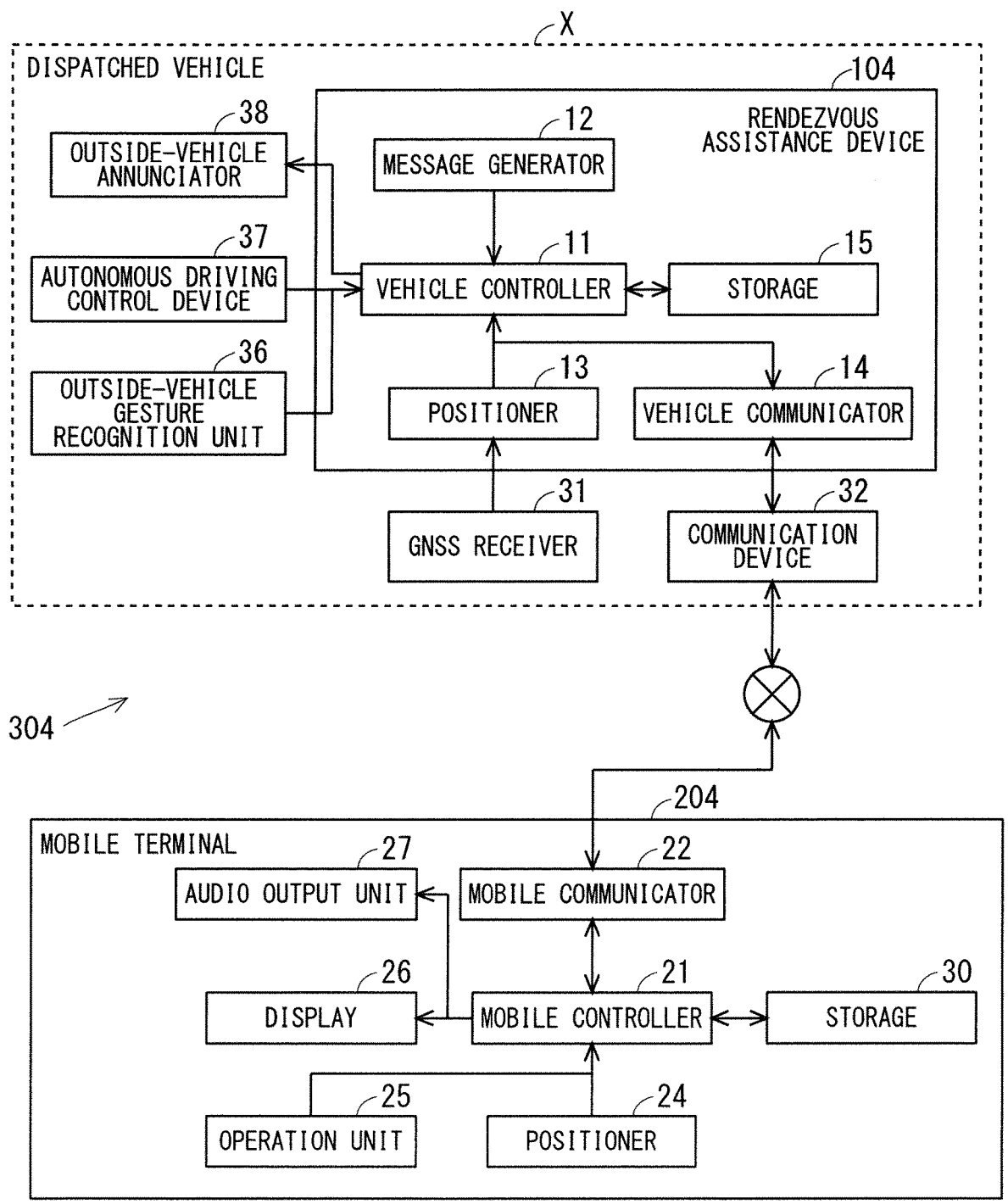
FIG. 36 is a block diagram illustrating a configuration of a rendezvous assistance system according to Embodiment 4.

FIG. 36 is a block diagram illustrating a configuration of a rendezvous assistance system 304 according to Embodiment 4. The rendezvous assistance system 304 includes a rendezvous assistance device 104 and a mobile terminal 204. A dispatched vehicle X on which the rendezvous assistance device 104 is mounted is a full autonomous driving vehicle that includes an autonomous driving control device 37. The autonomous driving control device 37 controls autonomous driving of the dispatched vehicle X. Thus, the dispatched vehicle X has no driver. Accordingly, the rendezvous assistance device 104 is different from the rendezvous assistance device 103 according to Embodiment 3 in that it is connected to the autonomous driving control device 37 and an outside-vehicle annunciator 38, and configured to be capable of using these devices, instead of being connected to the display device 33, the audio output device 34, and the manipulator 35 that serve as input and output interfaces for the driver,. The outside-vehicle annunciator 38 is an annunciator that is mounted on the dispatched vehicle X and may, for example, be a klaxon, a turn-signal flasher unit, a lighting device, or an outside-vehicle display. The outside-vehicle annunciator 38 makes an announcement to the user who has been identified by the vehicle controller 11 on the basis of the result of recognition by the outside-vehicle gesture recognition unit 36, so as to help the user notice the dispatched vehicle X.

D-2. Operations

Figure 37:
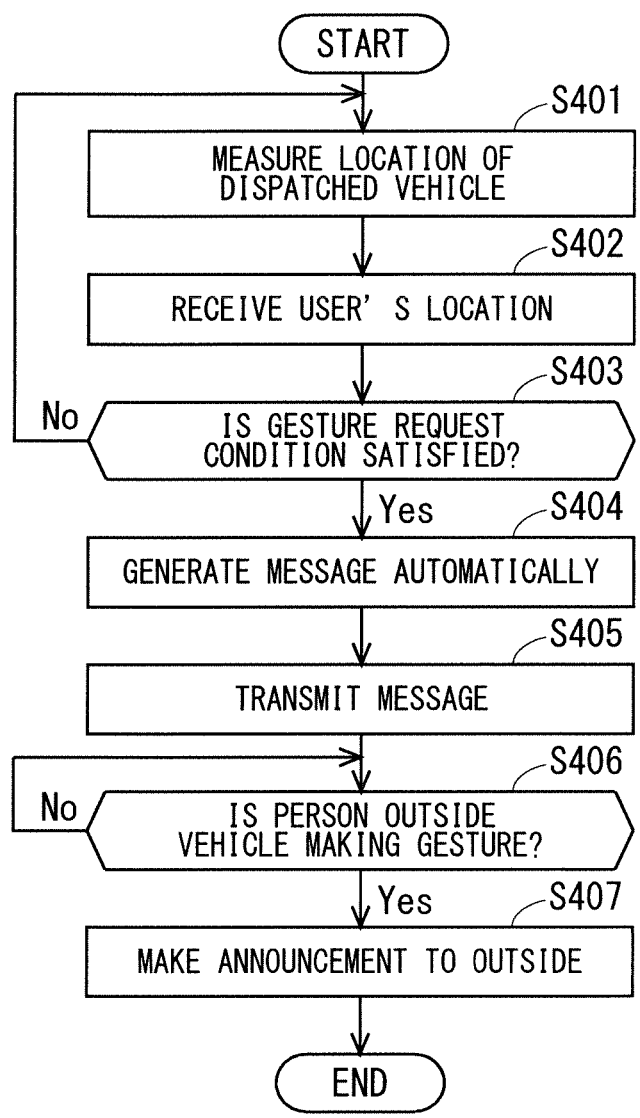
FIG. 37 is a flowchart illustrating operations of the rendezvous assistance device according to Embodiment 4.

FIG. 37 is a flowchart illustrating operations of the rendezvous assistance device 104. Hereinafter, the operations of the rendezvous assistance device 104 will be described with reference to the flowchart in FIG. 37.

When the autonomous driving control device 37 operates the dispatched vehicle X toward a meeting point by autonomous control, the positioner 13 acquires a GNSS signal from the GNSS receiver 31 and measures the location of the dispatched vehicle X (step S401). Then, the vehicle communicator 14 issues a request to transmit location information to the mobile terminal 204 and receives the location information on the mobile terminal 204 as location information on the user from the mobile terminal 204 (step S402).

Then, the vehicle controller 11 determines whether a gesture request condition is satisfied (step S403). One example of the gesture request condition may be a condition about the positional relationship of the dispatched vehicle X, the meeting point, and the user, such as a condition that the distance between the dispatched vehicle X and the meeting point is within a predetermined distance, e.g., 50 m, and the user is within 10 m from the meeting point. When the gesture request condition is not satisfied in step S403, the processing of the rendezvous assistance device 104 returns to step S401.

When the gesture request condition is satisfied in step S403, the message generator 12 automatically selects one gesture from among candidates for a gesture prepared in advance, and generates a message that requests the user to do the selected gesture (step S404). Here, the message generator 12 may give precedence to the candidates for a gesture, for example, in ascending order of load required for execution or in order of easiness of automatic recognition, and may select the gesture with highest precedence. As another alternative, the vehicle controller 11 may acquire current gestures that persons outside the vehicle are making from the outside-vehicle gesture recognition unit 36, and the message generator 12 may exclude those gestures made by the persons outside the vehicle from the selection. Then, the vehicle communicator 14 transmits the message to the mobile terminal 204 (step S405).

Thereafter, the vehicle controller 11 determines whether any person outside the vehicle has made the requested gesture (step S406). When the requested gesture is made by a person outside the vehicle, the outside-vehicle gesture recognition unit 36 detects this and sends a notification to the vehicle controller 11. The vehicle controller 11 makes this determination in step S406 in accordance with the notification received from the outside-vehicle gesture recognition unit 36. The vehicle controller 11 repeats step S406 until the requested gesture is made by a person outside the vehicle. When having determined in step S406 that the requested gesture is made by a person outside the vehicle, the vehicle controller 11 identifies this person who is making the gesture as its user. Then, the vehicle controller 11 makes an announcement that the dispatched vehicle X is his/her dispatched vehicle to the user via the outside-vehicle annunciator 38 (step S407). Through the processing described above, the operations of the rendezvous assistance device 104 end.

Figure 38:
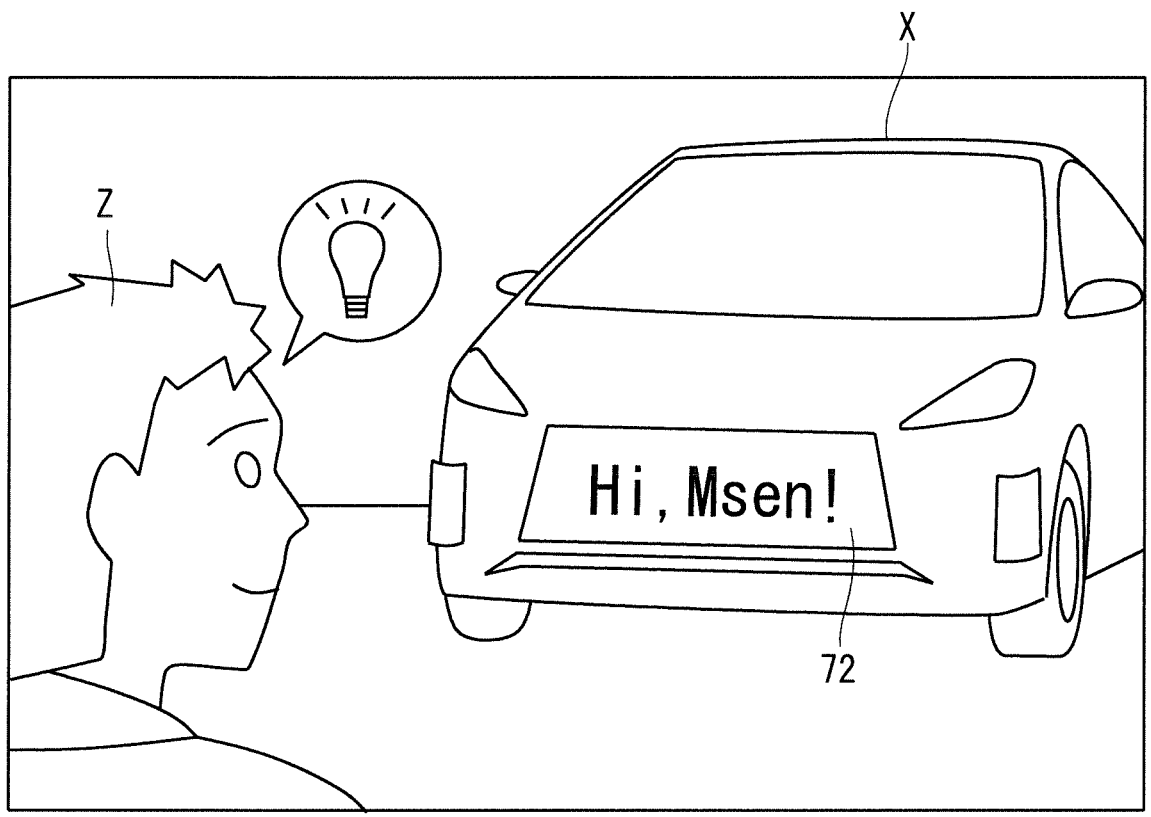
FIG. 38 shows an example of an announcement made via an outside-vehicle annunciator.

Next, an example of an announcement made via the outside-vehicle annunciator 38 will be described. FIG. 38 shows an example in which an outside-vehicle display 72 provided on the front grille of the dispatched vehicle X serves as the outside-vehicle annunciator 38. The outside-vehicle display 72 displays "Hi, Msen!" Here, it is assumed that "Msen" represents identification information that is specific to the user and provided from the mobile terminal 204 to the rendezvous assistance device 104 and stored in the storage 15 when a vehicle dispatch contract is concluded between the user and the dispatched vehicle X.

FIG. 39 shows an example in which the headlights of the dispatched vehicle X serve as the outside-vehicle annunciator 38. An announcement is made to the user by irradiating the foot of the user with the headlights. In the rendezvous assistance device 104 in which the user is identified by gesture recognition, the location of the user can be identified with high precision. Accordingly, it is possible to make an announcement as illustrated in FIG. 39, using the location information on the user identified with high precision.

The outside-vehicle annunciator 38 may make an announcement only while the user is making a gesture.

E. Embodiment 5

E-1. Configuration

Figure 40:
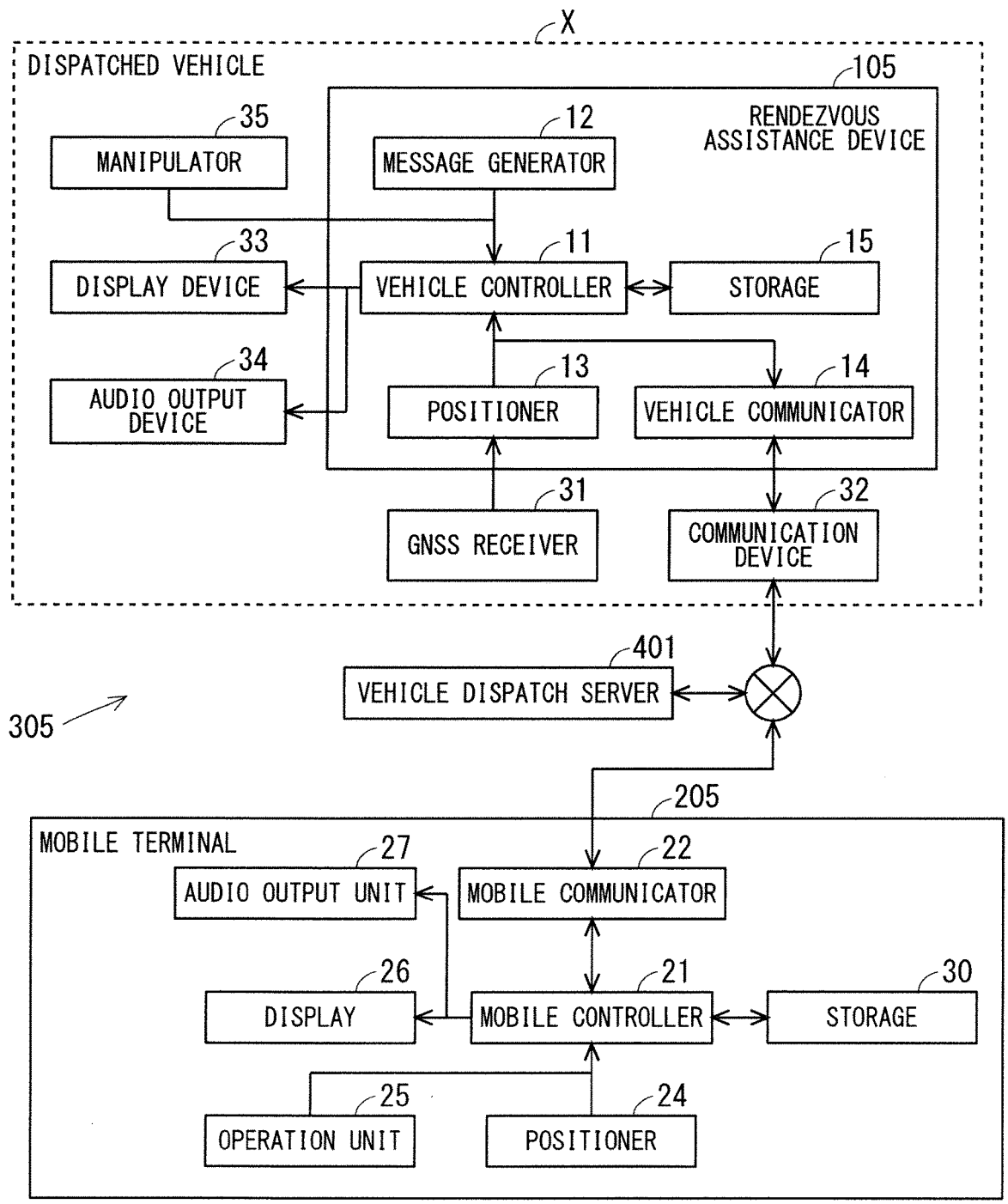
FIG. 40 is a block diagram illustrating a configuration of a rendezvous assistance system according to Embodiment 5.

FIG. 40 is a block diagram illustrating a configuration of a rendezvous assistance system 305 according to Embodiment 5. The rendezvous assistance system 305 includes a rendezvous assistance device 105, a mobile terminal 205, and a vehicle dispatch server 401. The configurations of the rendezvous assistance device 105 and the mobile terminal 205 are similar to the configurations of the rendezvous assistance device 102 and the mobile terminal 202A according to Embodiment 2.

The vehicle dispatch server 401 configures a communication network with the communication device 32 and the mobile communicator 22. The descriptions in Embodiments 1 to 4 are given on the premise that a vehicle dispatch contract has been concluded between the rendezvous assistance device and the mobile terminal. In the rendezvous assistance system 305, the vehicle dispatch server 401 performs processing for concluding a vehicle dispatch contract. Operations of the rendezvous assistance system 305 other than the processing for concluding a vehicle dispatch contract are similar to the operations of the rendezvous assistance system 302A according to Embodiment 2, and therefore the following description focuses on the processing for concluding a vehicle dispatch contract.

E-2. Operations

Figure 41:
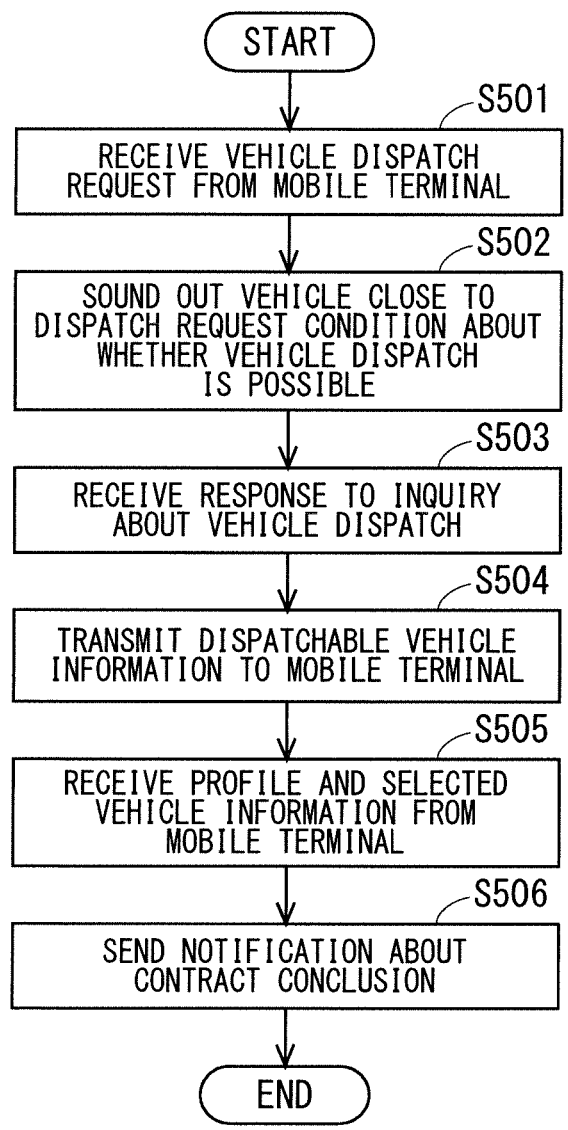
FIG. 41 is a flowchart illustrating operations of a vehicle dispatch server according to Embodiment 5.

FIG. 41 is a flowchart illustrating operations of the vehicle dispatch server 401. Hereinafter, the operations of the vehicle dispatch server 401 will be described with reference to the flowchart in FIG. 41. First, the vehicle dispatch server 401 receives a vehicle dispatch request from the mobile terminal 205 (step S501). The vehicle dispatch request includes information on the meeting point and may further include conditions that are required for the dispatched vehicle by the user, such as desired vehicle type.

Then, the vehicle dispatch server 401 sounds out the rendezvous assistance device 105 of at least one dispatched vehicle X that satisfies the vehicle dispatch request about whether vehicle dispatch is possible (step S502). If there are no conditions for requesting vehicle dispatch, the vehicle dispatch server 401 may sound out the rendezvous assistance device 105 of at least one dispatched vehicle X that is close to the meeting point about whether vehicle dispatch is possible. Here, the vehicle dispatch server 401 may sound out the rendezvous assistance device 105 of an autonomous driving vehicle preferentially about whether vehicle dispatch is possible.

Then, the vehicle dispatch server 401 receives a response to the inquiry about whether vehicle dispatch is possible from the rendezvous assistance device 105 of the dispatched vehicle X that has been sounded out about the possibility of vehicle dispatch (step S503). Then, the vehicle dispatch server 401 transmits to the mobile terminal 205 information on the dispatched vehicle X from which the response indicating that vehicle dispatch is possible has been received (step S504). Thereafter, the vehicle dispatch server 401 receives, from the mobile terminal 205, information on the user's profile and information on the dispatched vehicle X that is selected as a dispatched vehicle by the user (selected vehicle information) (step S505).

Then, the vehicle dispatch server 401 transmits the user's profile to the rendezvous assistance device 105 of the dispatched vehicle X selected as a dispatched vehicle by the user, and sends a notification about the conclusion of a contract to both of the dispatched vehicle X and the rendezvous assistance device 105 of the mobile terminal 205 (step S506). The user's profile as used herein may include, for example, payment information for the user, information about where to make contact, and the identification information referred to in <B-7>.

Although the vehicle dispatch server 401 performs the processing for concluding a vehicle dispatch contract in the above description, the rendezvous assistance device 105 and the mobile terminal 205 may directly perform the processing for concluding a vehicle contract.

F. Hardware Configuration

In the rendezvous assistance devices 101 to 105 described above, the vehicle controller 11, the message generator 12, the positioner 13, the vehicle communicator 14, and the storage 15 are implemented via a processing circuit 81 illustrated in FIG. 42. That is, the processing circuit 81 that configures each of the rendezvous assistance devices 101 to 105 includes the vehicle controller 11, the message generator 12, the positioner 13, the vehicle communicator 14, and the storage 15 (hereinafter, referred to as the "vehicle controller 11 and other constituent elements"). In the mobile terminals 201, 202A, 202B, and 203 to 205 described above, the mobile controller 21, the mobile communicator 22, and the positioner 24 are also implemented via the processing circuit 81 illustrated in FIG. 42. That is, the processing circuit 81 that configures each of the mobile terminals 201, 202A, 202B, and 203 to 205 includes the mobile controller 21, the mobile communicator 22, and the positioner 24 (hereinafter, referred to as the "mobile controller 21 and other constituent elements"). For example, dedicated hardware may be applied to the processing circuit 81, or a processor that executes programs stored in a memory may be applied to the processing circuit 81. Examples of the processor include a central processing unit, a processing device, an arithmetic unit, a microprocessor, a microcomputer, and a digital signal processor (DSP).

In the case where the processing circuit 81 is dedicated hardware, the processing circuit 81 corresponds to, for example, a single circuit, a composite circuit, a programmed processor, a parallel-programmed processor, an application specific integrated circuit (ASIC), a field-programmable gate array (FPGA), or any combination of these circuits. The functions of constituent elements, such as the vehicle controller 11 and other constituent elements or the mobile controller 21 and other constituent elements, may be implemented via a plurality of processing circuits 81, or may be collectively implemented via a single processing circuit.

In the case where the processing circuit 81 is a processor, the functions of constituent elements, such as the vehicle controller 11 and other constituent elements or the mobile controller 21 and other constituent elements, are implemented by combination with software (e.g., software, firmware, or both software and firmware). The software or the like is described as a program and stored in a memory. As illustrated in FIG. 43, a processor 82 that is applied to the processing circuit 81 achieves the function of each constituent element by reading and executing programs stored in a memory 83. That is, each of the rendezvous assistance devices 101 to 105 includes the memory 83 that stores a program for causing the processing circuit 81 to eventually execute a step of generating a message that requests a user to do a gesture, a step of transmitting the message to the mobile terminal 201, 202A, 202B, or 203 to 205 when the dispatched vehicle is at or around the meeting point. In other words, it can also be said that this program causes a computer to execute the procedure or method performed by the vehicle controller 11 and other constituent elements. Each of the mobile terminals 201, 202A, 202B, and 203 to 205 also includes the memory 83 that stores a program for causing the processing circuit 81 to eventually execute a step of receiving a message from the rendezvous assistance devices 101 to 105 and the step of sending a notification that requests the user to do a gesture to the user on the basis of the message. In other words, it can also be said that this program causes a computer to execute the procedure or method performed by the mobile controller 21 and other constituent elements. Examples of the memory 83 may include non-volatile or volatile semiconductor memories such as a random access memory (RAM), a read only memory (ROM), a flash memory, an erasable programmable read only memory (EPROM), or an electrically erasable programmable read only memory (EEPROM), a hard disk drive (HDD), a magnetic disk, a flexible disk, an optical disk, a compact disk, a mini-disk, a digital versatile disk (DVD), and drivers for these disks, and or any other possible storage medium that may be used in the future.

In the configurations described above, the functions of the vehicle controller 11 and other constituent elements and the mobile controller 21 and constituent elements are implemented via either hardware or software. However, the present disclosure is not limited thereto, and the rendezvous assistance devices 101 to 105 may be configured such that some of the vehicle controller 11 and other constituent elements are implemented via dedicated hardware, and the other constituent elements are implemented via software. The mobile terminals 201, 202A, 202B, and 203 to 205 may also be configured such that some of the mobile controller 21 and other constituent elements are implemented via dedicated hardware, and the other constituent elements are implemented via software.

As described above, the processing circuits can achieve each of the above-described functions via hardware, software, or any other service or via any combination of them. Although the storage 15 is configured with the memory 83, the storage 15 may be configured with a single memory 83, or with individual memories. The same applies to the storage 30.

Although the rendezvous assistance devices 101 to 105 are on-vehicle devices in the above description, the present disclosure is also applicable to systems that are constructed by appropriately combining a portable navigation device (PND), a communication terminal (e.g., a mobile terminal such as a mobile phone, a smartphone, or a tablet), the functions of applications installed in these devices, and servers (including the vehicle dispatch server 401 and other servers). In this case, the functions or constituent elements of the rendezvous assistance devices 101 to 105 described above may be distributed into and arranged in each equipment that constructs a system, or may be collectively arranged in any one equipment.

While the invention has been shown and described in detail, the foregoing description is in all aspects illustrative and not restrictive. It is therefore to be understood that numerous modifications and variations can be devised without departing from the scope of the invention.

EXPLANATION OF REFERENCE SIGNS 11 vehicle controller
12 message generator
13 positioner
14 vehicle communicator
15 storage
21 mobile controller
22 mobile communicator
23 notification unit
24 positioner
25 operation unit
26 display
27 audio output unit
28 rear camera
29 front camera
30 storage
31 GNSS receiver
32 communication device
33 display
34 audio output device
35 manipulator 36 outside-vehicle gesture recognition unit
37 autonomous driving control device
38 outside-vehicle annunciator
50 to 52, 66 to 69 object
54 to 56 icon
70 display
71 speaker
72 outside-vehicle display
81 processing circuit
82 processor
83 memory
101 to 105 rendezvous assistance device
201, 202A, 202B, 203 to 205 mobile terminal
301, 302A, 302B, 303 to 305 rendezvous assistance system
401 vehicle dispatch server

The invention claimed is:

1. A rendezvous assistance system comprising:
a mobile terminal carried by a user who wants to rendezvous with a dispatched vehicle; and
a rendezvous assistance device that communicates with the mobile terminal and assists rendezvous of the dispatched vehicle and the user at a meeting point,
the rendezvous assistance device including:
a first processor to execute a first program; and
a first memory to store the first program which, when executed by the first processor, performs processes of,
generating a message that requests the user to do a gesture,
determining timing when the dispatched vehicle is at or around the meeting point as timing of transmission of the message,
wherein the message includes a type of the gesture, the type of the gesture including a body-part attribute and a motion attribute, the body-part attribute indicating a body part that makes the gesture, and a motion attribute indicating how the body part indicated by the body-part attribute is moved,
determining a type of the gesture specified by a driver of the dispatched vehicle as the type of the gesture to be included in the message, and
transmitting the message to the mobile terminal with the timing of transmission, and
the mobile terminal including:
a second processor to execute a second program; and
a second memory to store the second program which, when executed by the second processor, performs processes of,
receiving the message from the rendezvous assistance device, and
sending a notification that requests the user to do the gesture in accordance with the message, wherein
the rendezvous assistance device causes a display mounted on the dispatched vehicle to display a gesture selection screen for selecting the type of the gesture, and determines the type of the gesture to be included in the message in accordance with a result of selection made by a driver of the dispatched vehicle on the gesture selection screen.

2. The rendezvous assistance system according to claim 1, wherein
the rendezvous assistance device causes a display mounted on the dispatched vehicle to display a positional relationship of the dispatched vehicle, the meeting point, and the mobile terminal.

3. The rendezvous assistance system according to claim 2, wherein
the rendezvous assistance device acquires driver operation information on the dispatched vehicle and causes the display to display the positional relationship of the dispatched vehicle, the meeting point, and the mobile terminal with timing based on the driver operation information.

4. The rendezvous assistance system according to claim 2, wherein
the rendezvous assistance device acquires driver operation information on the dispatched vehicle and determines the timing of transmission of the message in accordance with timing based on the driver operation information.

5. The rendezvous assistance system according to claim 1, wherein
the rendezvous assistance device determines the type of the gesture to be included in the message from a result of recognizing a speech voice of a driver of the dispatched vehicle.

6. The rendezvous assistance system according to claim 1, wherein
the rendezvous assistance device acquires a result of recognizing a gesture of a driver of the dispatched vehicle from an on-vehicle gesture recognition unit and determines the type of the gesture to be included in the message from the result of recognizing the gesture of the driver, the on-vehicle gesture recognition being mounted on the dispatched vehicle and recognizing a gesture of a person in the dispatched vehicle.

7. The rendezvous assistance system according to claim 1, wherein
when executed by the second processor, the second program performs processes of,
acquiring operation information on the user,
when acquiring operation information on an intention of the user to do the gesture, the mobile terminal transmits information that indicates the intention of the user to do the gesture to the rendezvous assistance device, and
the rendezvous assistance device notifies the driver of the dispatched vehicle of the intention of the user to do the gesture.

8. The rendezvous assistance system according to claim 7, wherein
when the user does not do the gesture, the mobile terminal acquires, from the user, operation input of identification information for identifying the user,
the mobile terminal transmits the identification information to the rendezvous assistance device, and
the rendezvous assistance device notifies the driver of the dispatched vehicle of the identification information.

9. The rendezvous assistance system according to claim 1, wherein
the mobile terminal acquires a location of the dispatched vehicle from the rendezvous assistance device, and
when a distance between the dispatched vehicle and the mobile terminal is less than a threshold value, the mobile terminal notifies the user of information indicating that the distance between the dispatched vehicle and the mobile terminal is less than the threshold value.

10. The rendezvous assistance system according to claim 1, wherein
the mobile terminal acquires a location of the dispatched vehicle from the rendezvous assistance device, and
the mobile terminal notifies the user of a direction of approach of the dispatched vehicle to the meeting point.

11. The rendezvous assistance system according to claim 10, wherein
the rendezvous assistance device identifies a person who is doing the gesture requested to do by the message outside the dispatched vehicle as the user in accordance with the result of recognizing a gesture by the outside-vehicle gesture recognition unit, and notifies the driver of the dispatched vehicle of the user identified.

12. The rendezvous assistance system according to claim 1, wherein
the rendezvous assistance device acquires a result of recognizing a gesture from an outside-vehicle gesture recognition unit that is mounted on the dispatched vehicle and that recognizes a gesture of a person who is outside the dispatched vehicle.

13. A rendezvous assistance system comprising:
a mobile terminal carried by a user who wants to rendezvous with a dispatched vehicle; and
a rendezvous assistance device that communicates with the mobile terminal and assists rendezvous of the dispatched vehicle and the user at a meeting point,
the rendezvous assistance device including:
a first processor to execute a first program; and
a first memory to store the first program which, when executed by the first processor, performs processes of,
generating a message that requests the user to do a gesture,
determining timing when the dispatched vehicle is at or around the meeting point as timing of transmission of the message,
transmitting the message to the mobile terminal with the timing of transmission,
acquiring a result of recognizing a gesture from an outside-vehicle gesture recognition unit that is mounted on the dispatched vehicle and that recognizes a gesture of a person who is outside the dispatched vehicle, and
identifying a person who is doing the gesture requested to do by the message outside the dispatched vehicle as the user in accordance with the result of recognizing a gesture by the outside-vehicle gesture recognition unit, and causing an outside-vehicle annunciator mounted on the dispatched vehicle to make an announcement to the user, and
the mobile terminal including:
a second processor to execute a second program; and
a second memory to store the second program which, when executed by the second processor, performs processes of,
receiving the message from the rendezvous assistance device, and
sending a notification that requests the user to do the gesture in accordance with the message, wherein
the dispatched vehicle is a full autonomous driving vehicle, and
the rendezvous assistance device causes a display mounted on the dispatched vehicle to display a gesture selection screen for selecting the type of the gesture, and determines the type of the gesture to be included in the message in accordance with a result of selection made by a driver of the dispatched vehicle on the gesture selection screen.

14. The rendezvous assistance system according to claim 13, wherein
the outside-vehicle annunciator is an outside-vehicle display provided on an outer surface of the dispatched vehicle, and
the rendezvous assistance device makes an announcement to the user by displaying identification information on the user on the outside-vehicle display.

15. The rendezvous assistance system according to claim 13, wherein
the outside-vehicle annunciator is a headlight of the dispatched vehicle, and
the rendezvous assistance device makes an announcement to the user by irradiating the user with the headlight.

16. A rendezvous assistance method comprising:
generating a message that requests a user who wants to rendezvous with a dispatched vehicle to do a gesture;
determining timing when the dispatched vehicle is at or around a meeting point with the user as timing of transmission of the message; and
transmitting the message to a mobile terminal of the user with the timing of transmission, wherein
the message includes a type of the gesture, the type of the gesture including a body-part attribute and a motion attribute, the body-part attribute indicating a body part that makes the gesture, and a motion attribute indicating how the body part indicated by the body-part attribute is moved,
the type of the gesture to be included in the message is specified by a driver of the dispatched vehicle, and
the type of the gesture is specified by the driver with a selection on a gesture selection screen on a display mounted on the dispatched vehicle.

* * * * *